US009593026B2

(12) United States Patent
Boal et al.

(10) Patent No.: US 9,593,026 B2
(45) Date of Patent: Mar. 14, 2017

(54) ORGANIC CONTAMINANT DESTRUCTION USING CHLORINE OR MIXED OXIDANT SOLUTION AND ULTRAVIOLET LIGHT

(75) Inventors: Andrew K. Boal, Albuquerque, NM (US); Susan Rivera, Ellensburg, WA (US); Justin Sanchez, Albuquerque, NM (US); Wesley Bradford, Los Alamos, NM (US)

(73) Assignee: Johnson Matthey Public Limited Company, London (GB)

( * ) Notice: Subject to any disclaimer, the term of this patent is extended or adjusted under 35 U.S.C. 154(b) by 1192 days.

(21) Appl. No.: 13/465,985

(22) Filed: May 7, 2012

(65) Prior Publication Data

US 2012/0298592 A1 Nov. 29, 2012

Related U.S. Application Data

(60) Provisional application No. 61/483,579, filed on May 6, 2011.

(51) Int. Cl.
*C02F 1/32* (2006.01)
*C02F 1/72* (2006.01)
*C02F 1/76* (2006.01)
*C02F 101/30* (2006.01)

(52) U.S. Cl.
CPC ............... *C02F 1/32* (2013.01); *C02F 1/725* (2013.01); *C02F 1/76* (2013.01); *C02F 2101/30* (2013.01); *C02F 2209/06* (2013.01); *C02F 2303/04* (2013.01); *Y02W 10/37* (2015.05)

(58) Field of Classification Search
CPC .. C02F 1/32; C02F 1/008; C02F 1/722; C02F 2101/34; C02F 2101/36; C02F 2101/38; A61L 9/205; Y02W 10/37
See application file for complete search history.

(56) References Cited

U.S. PATENT DOCUMENTS

| 3,234,110 A | 2/1966 | Beer |
| 4,135,493 A | 1/1979 | Kennedy |
| 4,387,961 A | 6/1983 | Winston |

(Continued)

FOREIGN PATENT DOCUMENTS

| ES | 2055666 A1 * | 8/1994 |
| WO | 03045534 | 6/2003 |

OTHER PUBLICATIONS

Ajona, J. I. et al., "The Use of CPC Collectors for Detoxification of Contaminated Water: Design, Construction and Preliminary Results", Solar Energy vol. 68, No. 1, 2000, 109-120.

(Continued)

*Primary Examiner* — Walter D Griffin
*Assistant Examiner* — Cameron Allen
(74) *Attorney, Agent, or Firm* — Philip D. Askenazy; Peacock Myers, P.C.

(57) ABSTRACT

Method and apparatus for destroying organic contaminants in a fluid. At least one oxidant is added to a contaminated fluid, which is then irradiated with ultraviolet radiation. The oxidant is preferably chlorine-based and generated on-site. The intensity of the radiation is higher than typical AOP processes. Various process parameters, such as the pH and/or flow rate of the contaminated fluid, and/or the relative intensities of various UV wavelength sources, are varied in response to measuring quality indicators.

12 Claims, 17 Drawing Sheets

(56) References Cited

U.S. PATENT DOCUMENTS

| | | | |
|---|---|---|---|
| RE32,077 E | | 2/1986 | deNora et al. |
| 4,761,208 A | | 8/1988 | Gram et al. |
| 5,174,904 A | | 12/1992 | Smith, II |
| 5,288,461 A | | 2/1994 | Gray |
| 5,308,507 A | | 5/1994 | Robson |
| 5,385,711 A | | 1/1995 | Baker et al. |
| 5,545,335 A | * | 8/1996 | Sween .................. 210/748.11 |
| 6,129,893 A | * | 10/2000 | Bolton .................. C02F 1/32 210/748.11 |
| 6,309,523 B1 | | 10/2001 | Prasnikar et al. |
| 6,447,720 B1 | | 9/2002 | Horton, III et al. |
| 6,524,475 B1 | | 2/2003 | Herrington et al. |
| 6,565,803 B1 | | 5/2003 | Bolton et al. |
| 7,531,095 B2 | | 5/2009 | Williamson et al. |
| 2002/0033369 A1 | | 3/2002 | Bender |
| 2005/0218082 A1 | * | 10/2005 | Williamson .......... A61L 9/205 210/739 |
| 2006/0151369 A1 | * | 7/2006 | Hegmegi .................. 210/149 |
| 2007/0007208 A1 | * | 1/2007 | Brugger .............. A61M 1/1656 210/645 |
| 2007/0170122 A1 | * | 7/2007 | Tabata .................. C02F 9/00 210/209 |
| 2007/0181498 A1 | | 8/2007 | Kaas |
| 2011/0024361 A1 | * | 2/2011 | Schwartzel ............. C02F 1/325 210/739 |
| 2011/0132843 A1 | * | 6/2011 | Fan .................. B01J 20/20 210/668 |
| 2012/0261349 A1 | * | 10/2012 | Kolstad .................. C02F 1/32 210/695 |

OTHER PUBLICATIONS

Bahnemann, Detlef, "Photocatalytic water treatment: solar energy applications", Solar Energy 77, 2004, 445-459.

Bajszar, George et al., "Stress-Induced Hsp70 Gene Expression and inactivation of Cryptosporidium parvum Oocysts by Chlorine-Based Oxidants", Applied and Environmental Microbiology, vol. 76, No. 6, 1129/2010, 1732-1739.

Benotti, Mark J. et al., "Pharmaceuticals and Endocrine Disrupting Compounds in U.S. Drinking Water", Environ. Sci. Technol. 2009, 43, 2009, 597-603.

Chen, Wen et al., "Fluorescence Excitation—Emission Matrix Regional Integration to Quantify Spectra for Dissolved Organic Matter", Environ. Sci. Technol, 2003, 37, 2003, 5701-5710.

Dickenson, Eric R. et al., "Haloacetic acid and Trihalomethane Formation from the Chlorination and Bromination of Aliphatic B-Dicarbonyl Acid Model Compounds", Environ. Sci. Technol, 2008, 42, 2008, 3226-3233.

Didier, Robert et al., "Solar photocatalysis: a clean process for water detoxification", The Science of the Total Environment 291, 2002, 85-97.

Feng, Yangang et al., "Photolysis of aqueous free chlorine species (HOCl and OCl) with 254 nm ultraviolet light", J. Environ. Eng. Sci, 6, 2007, 277-284.

Malato, Sixto et al., "Photocatalysis with solar energy at a pilot-plant scale: an overview", Applied Catalysis B: Environmental 37, 2002, 1-5.

Matilainen, Anu et al., "Removal of natural organic matter from drinking water by advanced oxidation processes", Chemosphere 80, May 21, 2013, 351-365.

McLoughlin, O. A. et al., "Photocatalytic disinfection of water using low cost compound parabolic collectors", Solar Energy 77, 2004, 625-633.

Phillips, Patrick J. et al., "Pharmaceutical Formulation Facilities as Sources of Opioids and Other Pharmaceuticals to Wastewater Treatment Plant Effluents", Environmental Science & Technology, vol. 44, No. 13, 2010, 4910-4916.

Pisarenko, Aleksey et al., "Investigation of the use of Chlorine Based Advanced Oxidation in Surface Water: Oxidation of Natural Organic Matter and Formation of Disinfection Byproducts", Journal of AOTs, Advanced Oxidation Technologies, vol. 16, No. 1, Jan. 31, 2013, 137-150.

Pisarenko, Aleksey N. et al., "Rapid analysis of perchlorate, chlorate and bromate ions in concentrated sodium hypochlorite solutions", Analytica Chimica Acta 659, 2010, 216-223.

Poland, Joseph, "Guidebook to Studies of land subsidence due to ground-water withdrawal", Unesco—International Hydrological Programme, Working Group 8.4, 1984, all.

Rosario-Ortiz, Fernando L. et al., "Characterization of dissolved organic matter in drinking water sources impacted by multiple tributaries", Water Research 41, 2007, 4115-4128.

Rosario-Ortiz, Fernando L. et al., "Characterization of the Polarity of Natural Organic Matter under Ambient Conditions by the Polarity Rapid Assessment Method (PRAM)", Environ. Sci. Technol. 2007, 41, 2007, 4895-4900.

Shaydullina, Gulnara et al., "Reaction of ortho-methoxybenzoic acid with the water disinfecting agents ozone, chlorine and sodium hypochlorite", Environ Chem Lett 3:1-5, Apr. 30, 2005, 1-5.

Trenholm, Rebecca A. et al., "Broad range analysis of endocrine disruptors and pharmaceuticals using gas chromatography and liquid chromatography tandem mass spectrometry", Chemosphere 65, 2006, 1990-1998.

Unknown, , "Global Water Intelligence", http://www.globalwaterintel.com/archieve/11/4/general/libya, 2010.

Vanderford, Brett J. et al., "Analysis of Endocrine Disruptors, Pharmaceuticals, and Personal Care Products in Water Using Liquid Chromatography/Tandem Mass Spectrometry", Anal. Chem. 2003, 75, 2003, 6265-6274.

Vanderford, Brett J. et al., "Analysis of p-chlorobenzoic acid in water by liquid chromatography-tandem mass spectrometry", Journal of Chromatography A, 1164, 2007, 219-223.

Vanderford, Brett J. et al., "Analysis of Pharmaceuticals in Water by Isotope Dilution Liquid Chromatography/ Tandem Mass Spectrometry", Environ. Sci. Technol. 2006, 40, 2006, 7312-7320.

Venczel, L. V. et al., "Inactivation of enteric microbes in water by electro-chemical oxidant from brine (NaCl) and free chlorine", Water Science and Technology vol. 50 No. 1, 2004, 141-146.

Venczel, Linda V. et al., "Inactivation of Cryptosporidium parvum Oocysts and Clostridium perfringens Spores by a Mixed-Oxidant Disinfectant and by Free Chlorine", Applied and Environmental Microbiology, Apr. 1997, 1598-1601.

Watts, Michael J. et al., "Chlorine photolysis and subsequent OH radical production during UV treatment of chlorinated water", Water Research 41, 2007, 2871-2878.

Disinfection & Water, , "Model Aquatic Health Code Disinfection and Water Quality Module Code Draft Sections for the First 60-day Review", Disinfection and Water Quality MAHC Code Draft Posted for Public Comment Feb. 27, 2012.

Office of Water—EPA, , "Ultraviolet Disinfection Guidance Manual for the Final Long Term 2 Enhanced Surface Water Treatment Rule", http://www.epa.gov/safewater/disinfection/lt2/compliance.html, Nov. 2006.

Tucker, M. D. et al., "Treatment of waste containing EDTA by chemical oxidation", Waste Management 19 (1999), 1999, 477-482.

Tucker, M. D. et al., "Treatment of waste containing EDTA by chemical oxidation", *Waste Management 19* 1999 , 477-482.

* cited by examiner

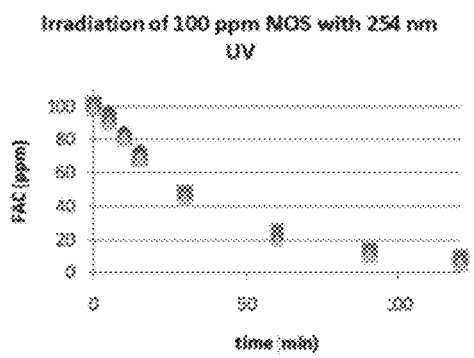
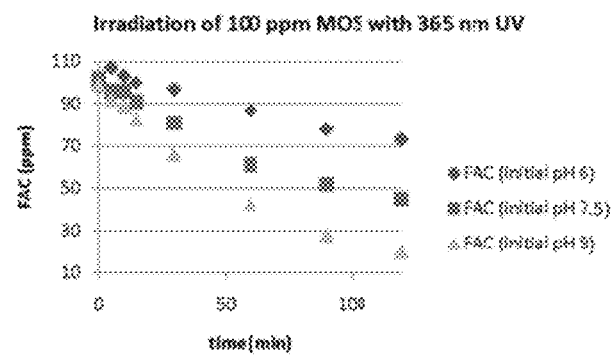
FIG. 10a  FIG. 10b
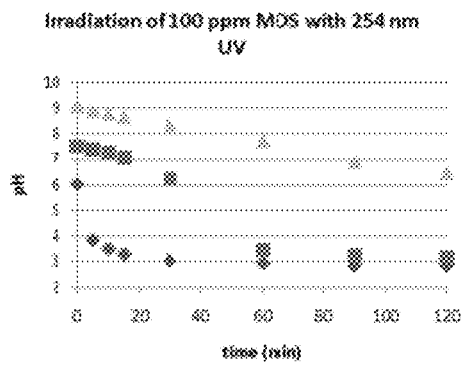
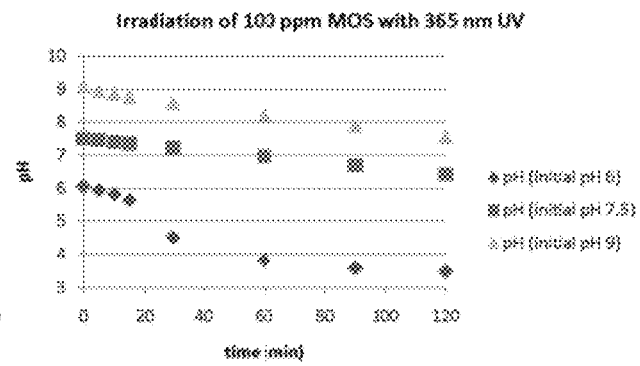
FIG. 11a  FIG. 11b

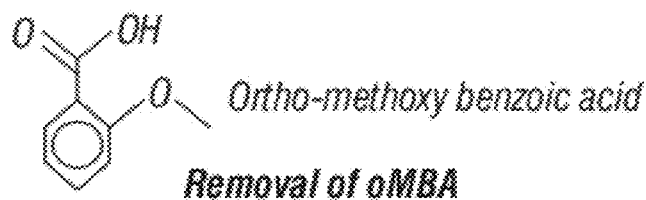
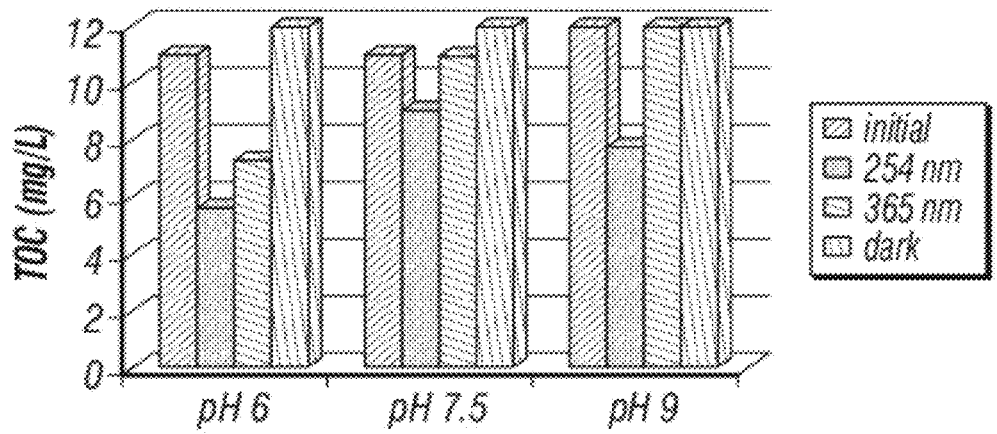
FIG. 15A
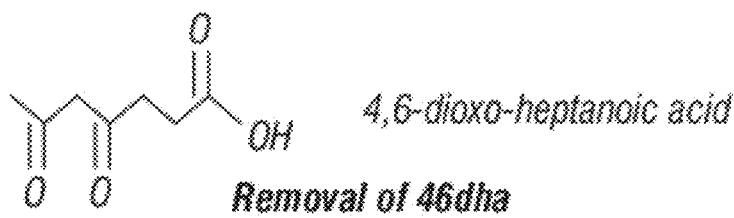
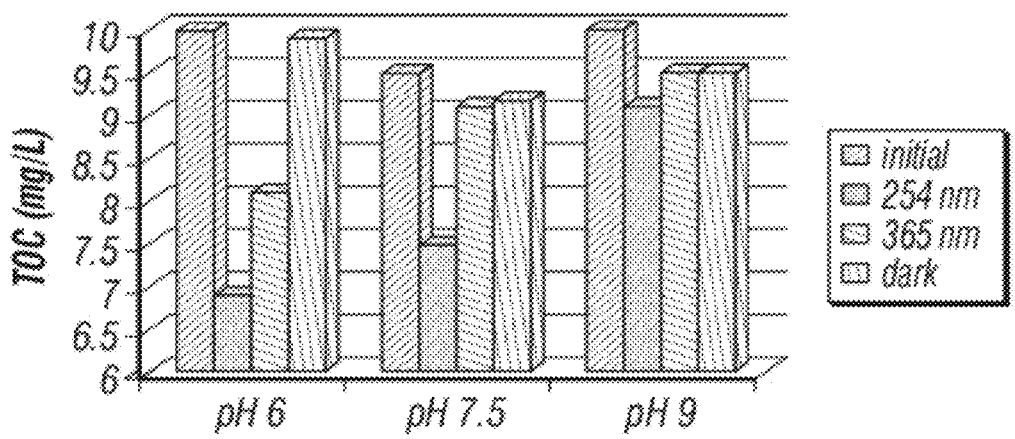
FIG. 15B

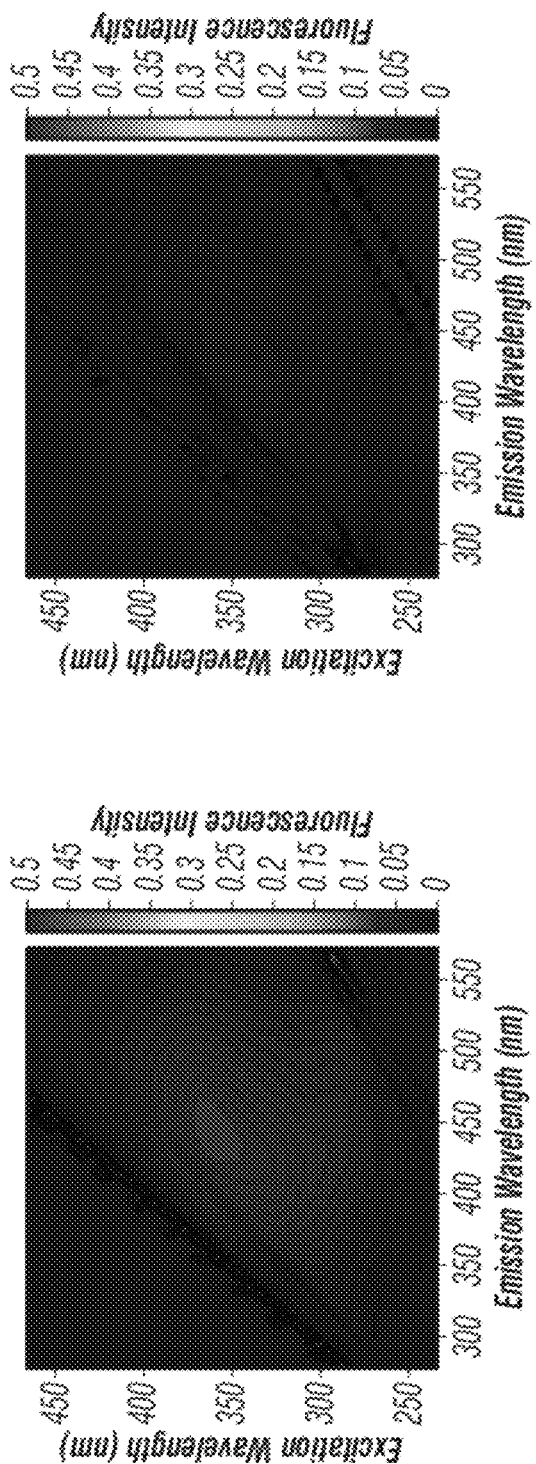
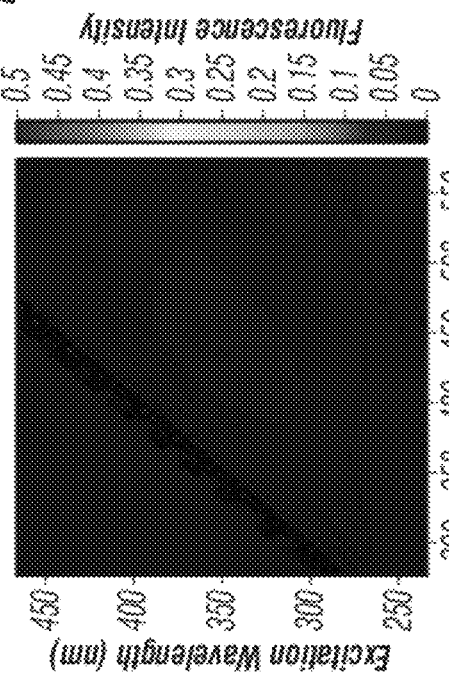
FIG. 17A
FIG. 17B
FIG. 17C

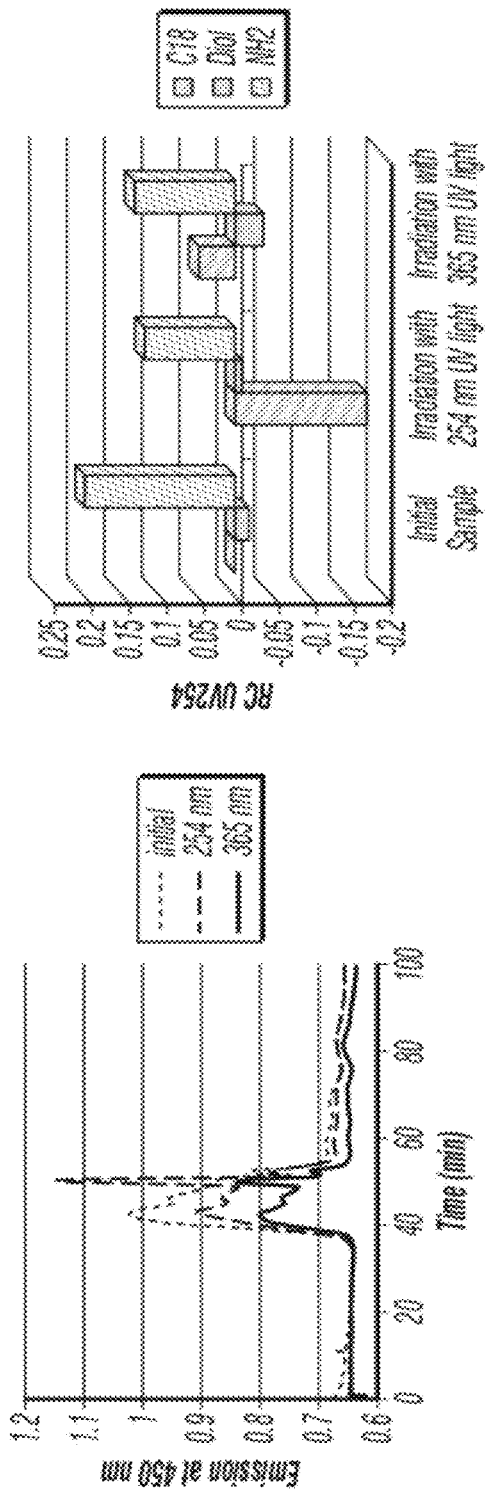
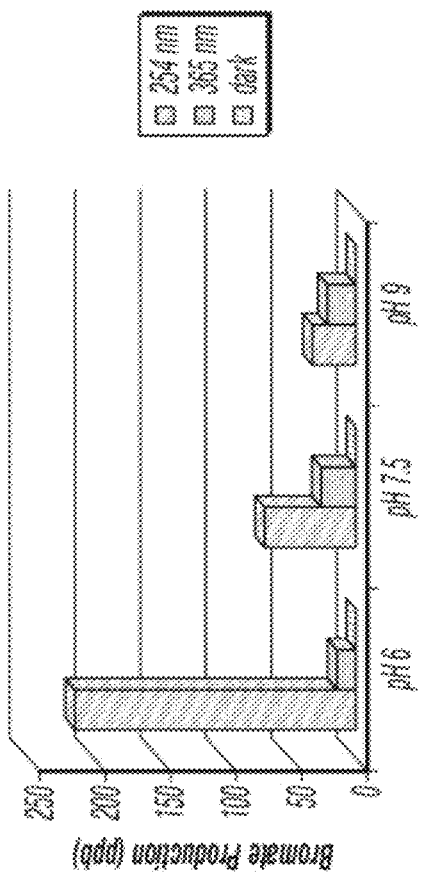
FIG. 18A
FIG. 18B
FIG. 19

ORGANIC CONTAMINANT DESTRUCTION USING CHLORINE OR MIXED OXIDANT SOLUTION AND ULTRAVIOLET LIGHT

CROSS-REFERENCE TO RELATED APPLICATIONS

This application claims priority to and the benefit of filing of U.S. Provisional Patent Application Ser. No. 61/483,579, entitled "Organic Compound Destruction Using Chlorine or Mixed Oxidant Solution and Ultraviolet Light", filed on May 6, 2011, the specification of which is incorporated herein by reference.

STATEMENT REGARDING FEDERALLY SPONSORED RESEARCH OR DEVELOPMENT

This invention was made with government support under Contract No. SBIR Phase I: IIP-0945851 and Award number for SBIR Phase II: IIP-1058239 awarded by the National Science Foundation. The government has certain rights in the invention.

BACKGROUND OF THE INVENTION

Field of the Invention (Technical Field)

The present invention relates to a method to use on-site generated sodium hypochlorite or on-site generated mixed oxidant solution in combination with ultraviolet radiation (UV) or concentrated solar ultraviolet (CSU) radiation to destroy organic compounds (including but not limited to endocrine disrupting compounds, color causing agents, volatile organic compounds, and oil in water mixtures) and inactivate microbial organisms.

Background Art

Note that the following discussion may refer to a number of publications and references. Discussion of such publications herein is given for more complete background of the scientific principles and is not to be construed as an admission that such publications are prior art for patentability determination purposes.

SUMMARY OF THE INVENTION (DISCLOSURE OF THE INVENTION)

An embodiment of the present invention is a method for destroying organic contaminants, the method comprising adding at least one oxidant to a contaminated fluid, thereby forming a mixture; irradiating the mixture with ultraviolet radiation; photolyzing the at least one oxidant; measuring an amount of quality indicator remaining in the fluid; and adjusting a process parameter to subsequently reduce the amount of organic contaminant remaining in the fluid to at or below a desired level. The at least one oxidant preferably comprises a chlorine-based oxidant, such as hypochlorite, sodium hypochlorite, mixed oxidants, hypochlorous acid, or combinations thereof. The intensity of the ultraviolet radiation is preferably greater than approximately 60 mJ/$cm^2$, more preferably greater than approximately 100 mJ/$cm^2$, and even more preferably greater than approximately 1000 mJ/$cm^2$. The ultraviolet radiation optionally comprises a plurality of wavelengths, in which case the adjusting step optionally comprises adjusting the relative intensities of the different wavelengths, preferably depending on the pH of the mixture prior to the irradiation step. The ultraviolet radiation optionally comprises concentrated solar radiation. The adjusting step optionally comprises adjusting the pH of the mixture prior to the irradiating step. The adjusting step preferably comprises adjusting the concentration of the at least one oxidant in the mixture, a flow rate of oxidant into the contaminated fluid, a flow rate of the contaminated fluid, and combinations thereof. The method preferably further comprises generating the at least one oxidant using an on-site generator located near a source of the contaminated fluid. The generating step optionally comprises using salt in the contaminated fluid to generate the at least one oxidant.

Another embodiment of the present invention is an apparatus for destroying organic contaminants, the apparatus comprising a pump for propelling a mixture of at least one oxidant and a contaminated fluid to an ultraviolet photoreactor comprising a source of ultraviolet radiation; a quality indicator sensor; and a controller for controlling at least one process parameter based on data obtained from the quality indicator sensor. The at least one oxidant preferably comprises a chlorine-based oxidant and further comprising an on-site generator for generating said chlorine-based oxidant. The brine input of the on-site generator is optionally connected to a source of the contaminated fluid. The source of ultraviolet radiation preferably comprises a solar concentrator and/or a plurality of ultraviolet lamps. In the latter case the ultraviolet lamps preferably emit ultraviolet radiation at different wavelengths, and the controller preferably adjusts relative intensities of the lamps in response to data from the quality indicator sensor. The source of ultraviolet preferably radiation emits radiation having an intensity greater than approximately 100 mJ/$cm^2$, and more preferably greater than approximately 1000 mJ/$cm^2$. The apparatus preferably further comprises a pH sensor disposed upstream of the photoreactor. The apparatus preferably further comprises sources of an acidic chemical and an alkaline chemical for controllably adding one or more of the chemicals to a flow of the contaminated fluid prior to its entering the photoreactor in response to data from the quality indicator sensor and/or the pH sensor. The apparatus preferably further comprises a flow sensor for measuring a flow rate of the contaminated fluid and a pump for adjusting said flow rate in response to data from said quality indicator sensor.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating certain embodiments of the invention and are not to be construed as limiting the invention. In the drawings:

FIGS. 10a and 10b are graphs showing changes in solution FAC of 100 mg/L MOS as a function of initial solution pH, UV light wavelength, and irradiation time for Example 2.

FIGS. 11a and 11b are graphs showing changes in solution pH of 100 mg/L MOS as a function of initial solution pH, UV light wavelength, and irradiation time for Example 2.

FIGS. 15a and 15b are graphs showing the decrease in TOC levels in MOS solutions of oMBA and 46 dha irradiated with 245 and 365 nm UV light. Structures of oMBA and 46 dha are shown at the top of the graphs for Example 2.

FIG. 17 shows 3D-Fluoresence images of raw CRW dosed with 10 ppm MOS, pH 7.5 (a) quenched immediately after the addition of MOS, (b) after two hours irradiation with 254 nm UV light, and (c) after two hours irradiation with 365 nm UV light for Example 2. The light blue region indicates the presence of humic acid.

FIG. 18 shows graphs of (a) SEC-Fluorescence traces and (b) PRAM analysis of CRW after a two hours reaction with 10 mg/L MOS in the dark and irradiated with either 254 nm or 365 nm UV light for Example 2.

FIG. 19 is a graph showing bromate production in 10 mg/L MOS spiked with 0.5 mg/L sodium bromide and irradiated with UV light for two hours for Example 2.

DETAILED DESCRIPTION OF THE INVENTION

Figure 1:
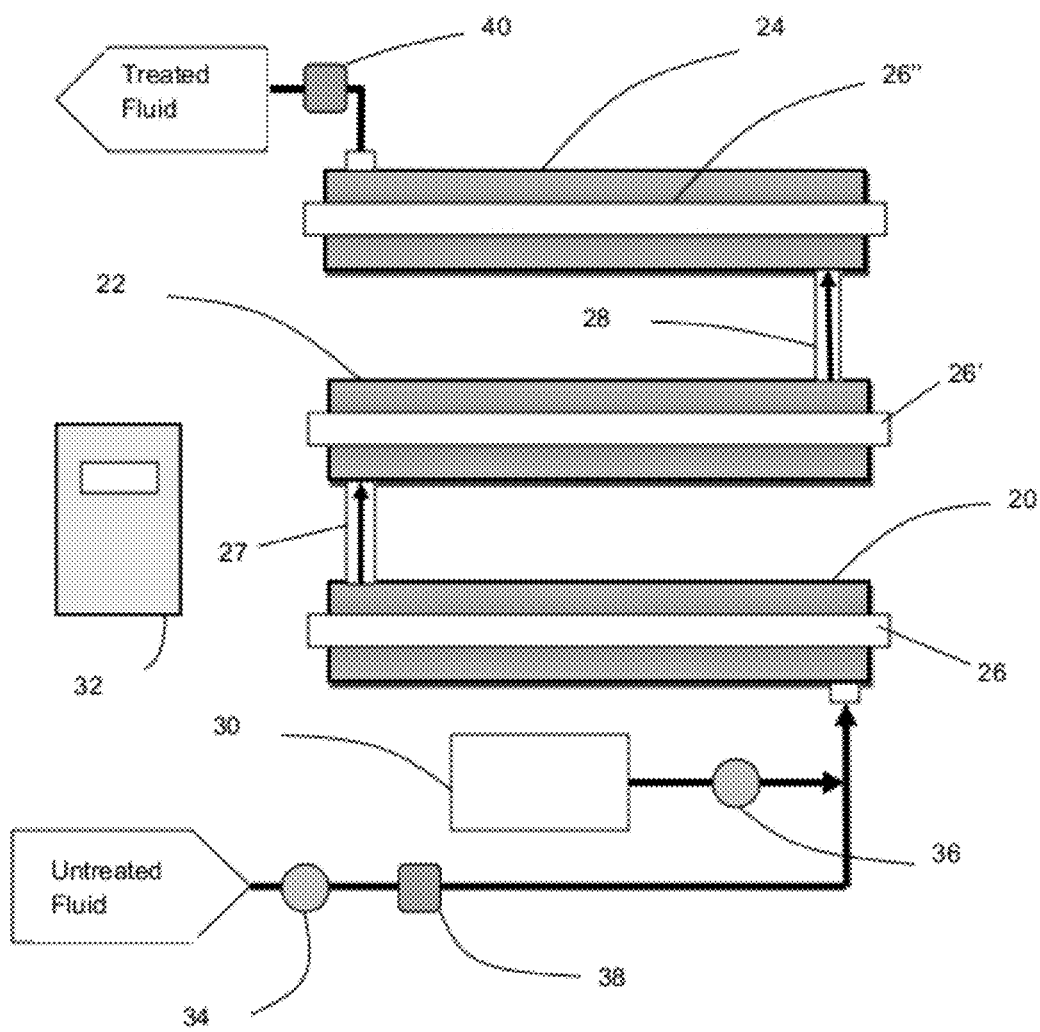
FIG. 1 is a schematic of an ultraviolet light system combined with an oxidant generation system and control system.

Embodiments of the present invention preferably combine an electrolytically generated oxidant solution, comprising for example sodium hypochlorite, hydrogen peroxide, or mixed oxidants, with a contaminated fluid stream in an ultraviolet reactor to generate strong oxidizing free radicals and other energetic oxidants to react with organics or microorganisms in the fluid stream. The reactions can destroy the organic materials and microorganisms or transform organic materials into smaller organic compounds. As used throughout the specification and claims, the term "organic contaminant" means any organic compound, organic molecule, organic material, natural organic matter, organism, microorganism, and the like, including, but not limited to endocrine disrupting compounds (EDCs), volatile organic compounds (VOCs), pharmaceuticals and personal care products (PPCPs), and oil in water mixtures. The UV reactor preferably comprises an electrically powered UV light producing UV having a wavelength between approximately 200 nanometers and approximately 400 nanometers, preferably emitting a variety of ultraviolet wavelengths that optimize the phytolysis of aqueous chlorine species, although single wavelengths, such as 254 nanometers may be utilized.

Hydrogen peroxide and UV, ozone and UV, and ozone and hydrogen peroxide combinations have been utilized in the past to accomplish organic destruction. Combinations of multiple oxidants or exposing waters containing oxidants to UV may create free radicals that oxidize organic compounds, a process known as an advanced oxidative process, or AOP. Hydrogen peroxide combined with ultraviolet radiation is one commonly used method to perform an AOP. However, in many applications, hydrogen peroxide must first be quenched after the AOP treatment has been completed and then additional chlorine added to maintain the disinfection residual required by many regulatory bodies. The use of mixed oxidant solution (MOS) or other chlorine-based oxidation combinations can facilitate the AOP while maintaining a chlorine residual for disinfection purposes. Neither ozone nor hydrogen peroxide can maintain such residuals. In some embodiments, organic compound contaminated fluid is fed directly in to an electrolytic cell to destroy the organic compounds, and then the subsequent solution is passed through a UV reactor to complete destruction of the organic compounds. Embodiments of the present invention are an integrated, safer and more cost effective way of generating an oxidant that is then combined with contaminated water in a UV reactor to oxidize organic compounds. In one embodiment of the present invention, the oxidant solution is produced consistently and separately using clean water and clean salt, and then combined with contaminated water or organic contaminated fluid, which is then flowed into a UV reactor, a much more reliable and maintenance-free approach to destruction of organics than passing the organic solution directly in to the electrolytic cell. Electrolytic cells can quickly become fouled if the organics are passed directly into the electrolytic cell.

Alternatively a photoreactor comprising two or more UV lamps that emit ultraviolet light at two or more different wavelengths, such as a medium pressure UV lamp that emits multiple wavelengths within the 200-400 nm spectrum, or alternatively two separate lamps that emit monochromatic wavelengths preferential to the photolysis of chlorine, may be used. In this embodiment, a pH sensor is preferably disposed upstream of the photoreactor to measure the pH value of the water to be treated. This value is preferably used to determine the relative intensities of the different UV lamps contained within the photoreactor. The advantage of this embodiment is that aqueous chlorine has different UV absorption profiles depending on if it is in the hypochlorous acid (HOCl) or hypochlorite (ClO$^-$) form. Since the relationship between the relative amounts of these two species in solution varies as a function of pH, the photoreactor preferably varies the relative output of several different UV lamps with even slight changes in the pH of the water to be treated. The actual numbers and wavelengths of the different lamps are preferably determined on a case-by-case approach for each specific application, and are preferably part of an integrated engineering approach that varies outputs depending upon desired contaminant destruction outcome. The pH of the solution may be adjusted after the addition of oxidant, but prior to entry into the UV photoreactor. A pH sensor is preferably linked to pumps capable of dosing either acidic or caustic solutions to the water stream to adjust the pH to the desired level.

In yet another embodiment of the present invention, the UV reactor may comprise a fluid passing through an ultraviolet transparent tube (such as a quartz tube) at the focal point of a parabolic concentrator or other form of a solar light collection device. Oxidants may be added to the fluid stream before the fluid is exposed to the concentrated solar light. The combination of oxidants in the contaminated solution and exposure to UV light produce strong oxidizing free radicals and other strong oxidants that then react with the organics to destroy them, reducing them to simple and safe compounds that include, but are not limited to, carbon dioxide, nitrogen gas, and water. In any of these embodiments, preferably substantially all of the liquid to be treated is irradiated at a minimum UV dose, or a sufficiently high intensity, to achieve the desired result.

Embodiments of the present invention comprise an electrolytic cell in combination with an ultraviolet source or lamp system that produces highly oxidative chemicals that can destroy organic compounds, including, but not limited to, Endocrine Disrupting Compounds (EDCs), Volatile Organic Compounds (VOCs), Pharmaceuticals and Personal Care Products (PPCPs), and oil in water mixtures. Additionally, embodiments of the present invention use the combinations of electrochemically produced oxidant solution and ultraviolet light to enhance the inactivation of microorganisms in a given water source. The electrochemical cell can produce several different oxidant species, including but not limited to, hypochlorite, hypochlorous acid, mixed oxidant solution, hydrogen peroxide, and/or ozone, which are added to a fluid (e.g. water) stream, which is then exposed to UV, such as UV from an artificial UV lamp or solar UV light.

An embodiment of the apparatus of the present invention comprises at least one electrochemical cell which comprises at least two electrodes with a minimum of one cathode and a minimum of one anode. The apparatus preferably comprises a control circuit for providing an electrical potential between at least one cathode and at least one anode, wherein the control circuit is in electrical contact with at least one cathode and at least one anode. During generation of oxidants, electrolyte is located within the cell housing between the anode and cathode, and a controlled electrical charge is preferably passed through the electrolytic solution from at least one cathode and at least one anode, thereby generating at least one oxidant in the electrolyte. A single anode and a single cathode electrolytic cell configuration is known as a mono-polar electrolytic cell. In an alternative embodiment of the electrolytic cell, one primary anode and one primary cathode are opposed to each other, and intermediate electrodes are placed between the primary anode and primary cathode. With any number of intermediate electrodes, the electrolytic cell configuration is known as a bi-polar electrolytic cell configuration. An energy source in electrical contact with the primary anode and primary cathode and a control circuit preferably delivers a controlled electrical voltage and current having predetermined voltage and current values.

The apparatus further comprises one or more UV light sources, such as cylindrical lamps, optionally arranged in a configuration to maximize oxidant photolysis, for example a parallel configuration, preferably disposed in one or more housings such that a fluid flows longitudinal or transverse to the axis of the UV lamps. UV lamps may operate with a frequency of about 254 nanometers (nm), or at other wavelengths as appropriate for optimal production of oxidants to destroy organic compounds of concern. UV lamps may also operate at frequencies such that maximal energy efficiency may be realized. These frequencies can accommodate solar energy sources. Fluid quality sensors and a control circuit are also preferably utilized to ensure maximum destruction of the contaminants of concern. For example, fluid quality sensors on the discharge of the UV lamp system may monitor the fluid quality and may increase or decrease the number of UV lamps that are being utilized, may increase or decrease the amount of mixed oxidant solution or other chlorine-based oxidant solution added to the fluid stream, and/or may increase or decrease the flow rate of the fluid in the system to ensure maximum destruction of the contaminants of concern.

Additional control mechanisms of the present invention can adjust the process on the basis of the pH of the fluid stream that is being treated. In one embodiment, a pH sensor is immersed in the fluid stream after the addition of oxidants generated from the electrochemical cell. Readings from this pH sensor are then preferably used to control pumps which are capable of adding either acidic or caustic chemicals to the fluid stream, thereby adjusting the pH of the fluid stream to a pre-determined level. Alternatively, the pH sensor can be linked to one or more UV lamps which emit more than one frequency of UV light. In this embodiment, the pH sensor feedback loop would be used to adjust the relative intensities of the different frequency UV lamps as a function of fluid pH in a predetermined fashion.

Referring to FIG. 1, a fluid is transferred by a flow control scheme such as fluid feed pump 34 via inlet fluid quality sensor 38 in series fashion into first UV light housing 20, then into second UV light housing 22, and subsequently into third UV light housing 24. The fluid exits third UV light housing 24, is sensed by outlet fluid quality sensor 40, and proceeds on to further processing or storage. Between each of the UV lamp housings, fluid connection tubes 27, 28 allow transfer of fluid between UV lamp housings. Each of the UV light housings comprises UV lamps 26, 26', and 26". The frequencies of UV lamps 26, 26', and 26" may be the same, or optionally may be different so that a combination of oxidizing solutions can be generated to maximize destruction of a particular contaminant of concern, or a combination of contaminants. Although three UV lamps are pictured in FIG. 1, only one lamp, or any number of lamps, may be employed. The UV lamp housings may alternatively be arranged in a parallel flow geometry.

Prior to UV irradiation, an oxidant solution, including but not limited to a mixed oxidant solution, produced by oxidant generator 30 is transferred via oxidant pump 36 in to the fluid stream. During UV irradiation, the oxidant solution is energized by the UV irradiation, thereby resulting in the formation of hydroxyl radicals and other reactive oxidant species which destroy contaminants such as organic compounds that may be present in the fluid flowing in the system. Oxidant generator 30 preferably produces an oxidant solution with a free available chlorine concentration of between approximately 4000 and 6000 mg/L. Alternative embodiments of this invention could replace oxidant generator 30 with generators of other chemicals such as sodium hypochlorite or hydrogen peroxide. Similarly, tanks of chemicals obtained through other means can also be used to replace oxidant generator 30.

Controller 32 preferably receives signals from input fluid quality monitor 38 and output fluid quality monitor 40. By monitoring the quality parameters from output fluid quality monitor 40, the control scheme is preferably programmed to optimize the destruction of contaminants of concern by controlling one or more of the following: the feed rate of fluid in the system with fluid feed pump 34, UV irradiation intensity in any of the UV lamps, feedback from the online contaminant monitor, shutdown of one or more of the multiple UV lamps in the system, and/or the flow rate of oxidant solution via oxidant pump 36.

For example, either or both sensors 38 and 40 may monitor the levels of free available chlorine (FAC), oxidant, and/or contaminant. As used throughout the specification and claims, the term "quality indicator" means a component or components of the fluid after irradiation, including but not limited to FAC, oxidant, organic contaminant, total organic carbon, dissolved organic carbon, and/or total dissolved solids. Specific target levels of quality indicator that should be present in the water passing through the present invention both before exposure to UV lamps 26, 26', and 26", as measured with sensor 38, as well as after UV exposure as measured at quality indicator sensor 40 are preferably predetermined. Controller 32 uses the information received from sensors 38 and 40 to vary either the amount of oxidant (or other chemical) solution to the water to be treated, the intensity of the UV lamps, and/or the fluid flow rate through the UV lamp housing. Other water quality measures may optionally be used to control the overall AOP, which include, but are not limited to, total organic carbon, dissolved organic carbon, and/or total dissolved solids. This control scheme is applicable to the system employing solar light in place of UV lamps.

An alternative embodiment of the apparatus combines the electrolytic cell with a system capable of focusing and harvesting solar ultraviolet light (SUL), for example one comprising a parabolic trough or compound parabolic trough concentrator. The SUL provides the UV energy source for advanced oxidation processes. In this apparatus, pumping mechanisms combine the oxidant stream with a stream of water to be treated and inject both streams into the solar concentrators. Once there, the combined streams move through a pipe made of UV transparent material (such as quartz) that preferably sits at the focal point of the solar concentrator. As the solution moves through the concentrator, solar UV light is collected and focused so that the SUL is harnessed to produce hydroxyl radical and other strong oxidizing agents that degrade contaminates in the waste stream. Such an apparatus could be further combined with a UV lamp mechanism that operates when the intensity of SUL is too low to adequately destroy contaminants. This mechanism preferably includes a SUL sensor which controls whether or not the UV lamps are in place over the solar collector and would turn the UV lamps on and off.

Figure 2:
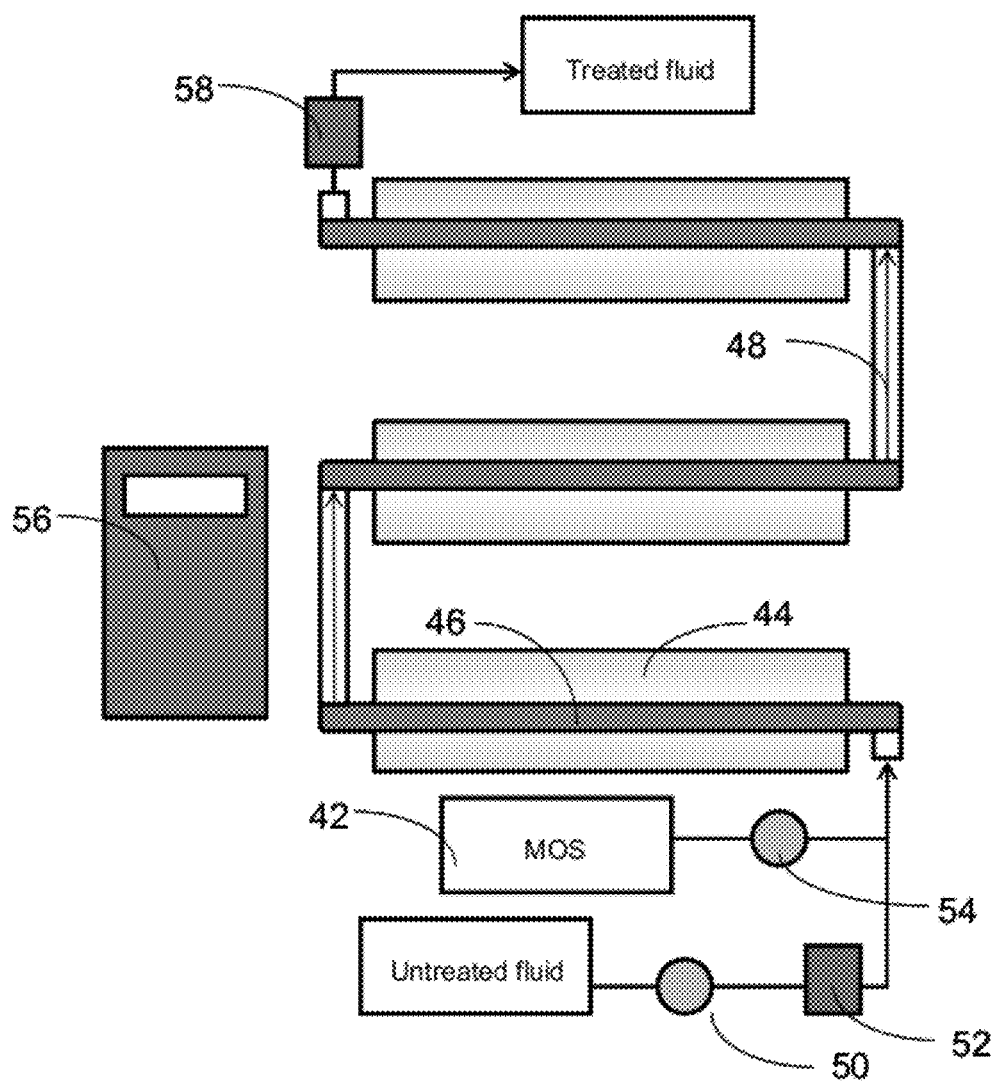
FIG. 2 is a schematic of solar parabolic concentrator system combined with an oxidant generation system and control system.

Referring to FIG. 2, untreated fluids are pumped into the system via pump 50 and monitored by sensor 52. Oxidant solution from generator 42 is then added to the untreated fluid stream through pump 54. The mixed fluid then moves into tube 46, which is placed at the focal point of solar concentrator 44. When several concentrators are to be used in series, each concentrator is connected so that the fluid mixture flows through tube 48 and into the last concentrator in series. As the fluid exits the concentrator(s), it preferably moves through sensor 58. This entire process is preferably controlled by controller 56, which is connected to the various pumps and sensors in the invention.

Figure 3:
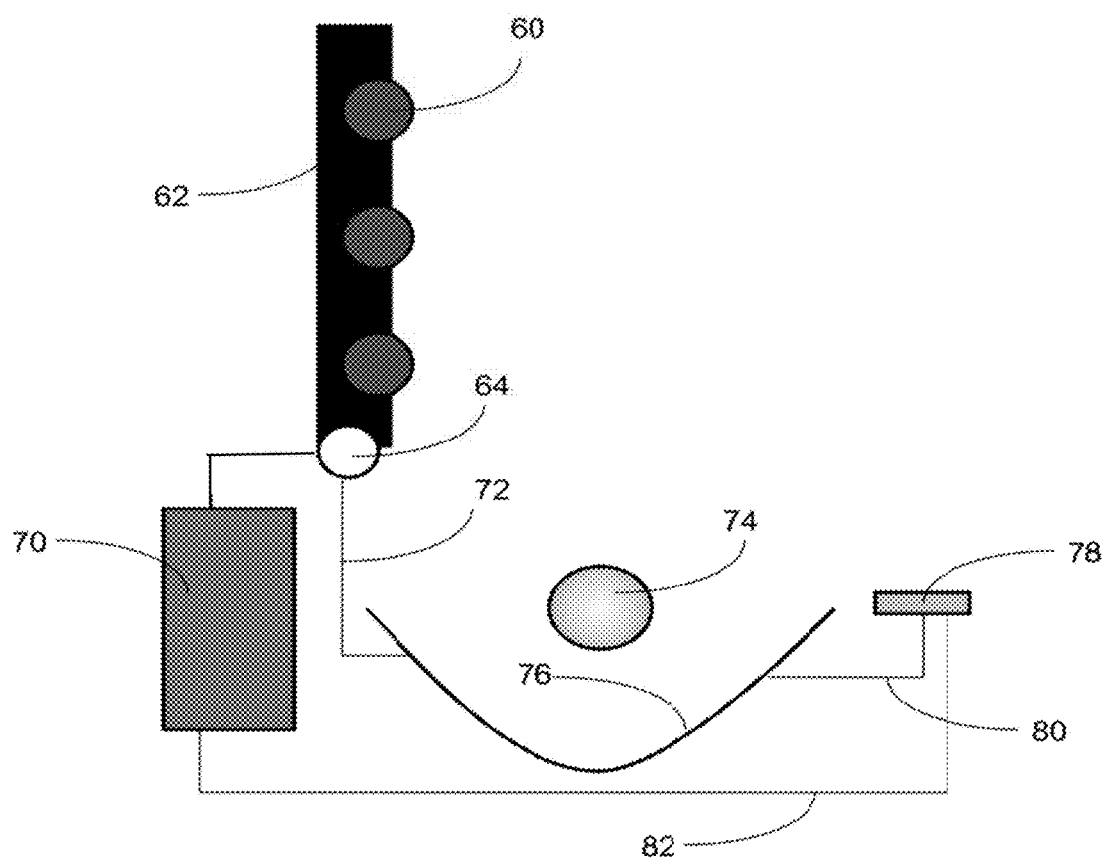
FIG. 3 is a schematic of a solar parabolic concentrator system combined with an oxidant generation system and control system, as well as an ultraviolet light backup system in the standby position.
Figure 4:
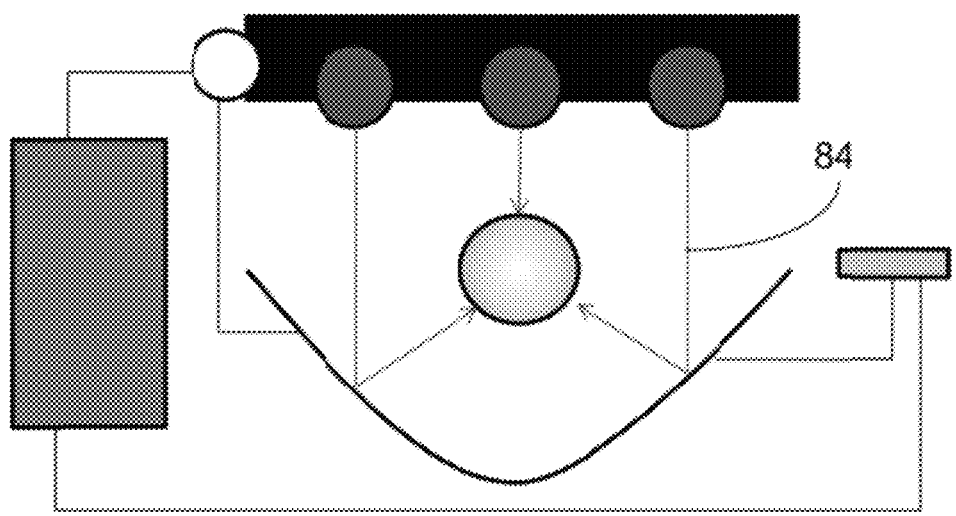
FIG. 4 is a schematic of a solar parabolic concentrator system combined with an oxidant generation system and control system, as well as an ultraviolet light backup system in the operating position.

FIG. 3 depicts an alternative embodiment of the invention that involves the use of a UV lamp as a backup to SUL. Here, UV lamps 60 are disposed in housing 62 which is connected to solar concentrator 76 via connector 72 and pivoting mount 64. SUL sensor 78 is likewise attached to the solar collector via connector 80 and is integrated electronically through 82 to controller 70. Controller 70 is preferably further connected through 68 to pivot mechanism 64 so that when sensor 78 determines that the SUL being collected by tube 74 has dropped below a threshold value, housing 62 moves to a lowered position so that light from UV lamps 60 illuminate the fluid moving through tube 74. FIG. 4 is an illustration where the lamp is in the lowered position and UV light 84 from the lamps irradiates the fluid in tube 74. Oxidant generator 42 preferably produces a mixed oxidant solution with a free available chlorine concentration of between 4000 and 6000 mg/L. Alternative embodiments of this invention replace mixed oxidant generator 42 with generators of other chemicals such as sodium hypochlorite or hydrogen peroxide. Similarly, tanks of chemicals obtained through other means can also be used to replace oxidant generator 42.

Figure 5:
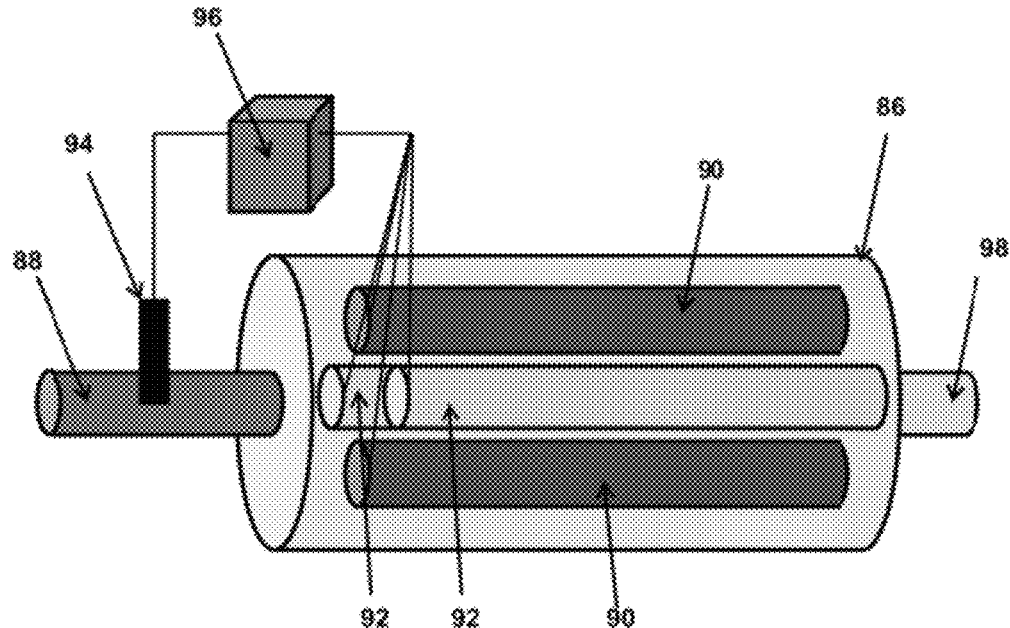
FIG. 5 is a schematic of a UV lamp photoreactor that contains more than one type of UV lamp and is preferably controlled through a pH feedback system.

An alternative embodiment of the present invention is a photoreactor containing multiple UV lamps that emit different wavelengths of ultraviolet light, such as a medium pressure UV lamp, as shown in FIG. 5. Here, the photoreactor is encased in body 86, and is fed with water to be treated through pipe 88. The water flows into reactor body 86, where lamps 90 and 92 are illuminated with lamp 90 emitting one wavelength of UV light and lamp 92 preferably emitting another wavelength of UV light. The pH of the water entering photoreactor body 86 is monitored by pH flow sensor 94, which is connected to control unit 96. Control unit 96 in turn varies the relative outputs of lamps 90 and 92 based on changes in the pH of the water entering reactor body 86. Finally, treated water exits reactor body 86 through tube 98. Alternative embodiments of a multiple lamp photoreactor could have any combination of total number of UV lamps and number of different wavelength UV lamps, all simultaneously controlled by a pH-based control circuit that can change the relative output of all lamps depending on properties of the water entering the photoreactor.

Figure 6:
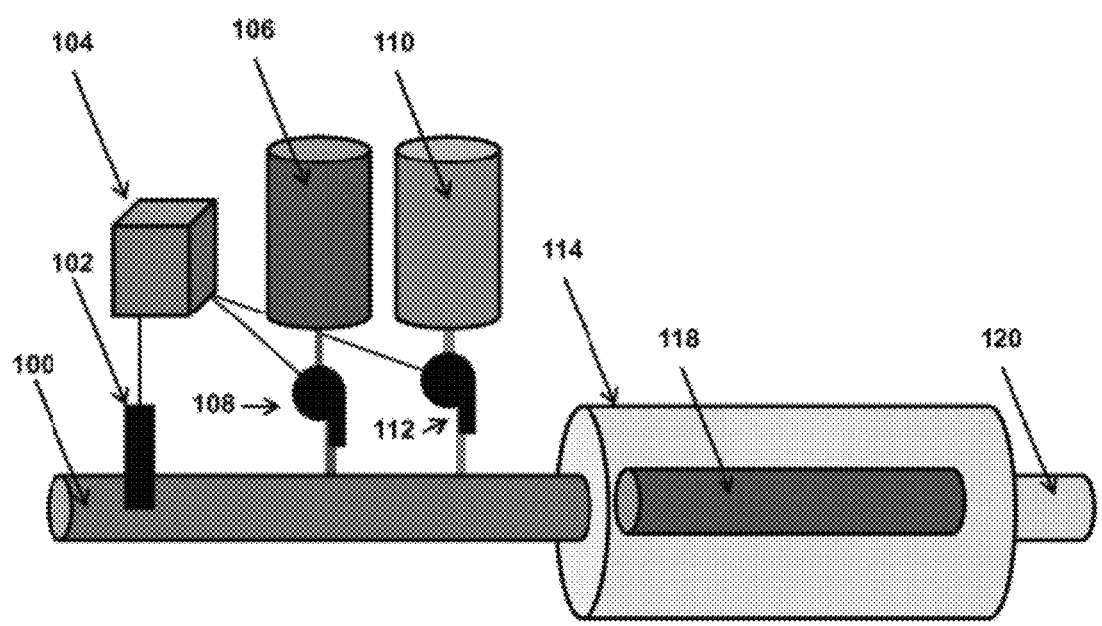
FIG. 6 is a schematic diagram showing a solution pH control system that can be used in conjunction with the present invention.

Another embodiment of the present invention is a where the system is capable of adjusting the pH of the water to be treated prior to entry into the photoreactor, as shown in FIG. 6. Here, the water to be treated that has been dosed previously with electrochemically generated oxidants is transported along pipe 100. The pH of this water is measured using sensor 102, which is connected to control system 104. If it is desirable for the pH of the water to be treated to be decreased, the acidic chemical stored in tank 106 is transferred via pump 108 to pipe 100. Alternatively, if it is advantageous to increase the pH of the water to be treated, caustic chemical stored in tank 110 is transferred using pump 112 to the water to be treated in pipe 100. Control unit 102 is connected to pumps 108 and 112 and is used to determine the dose levels of acidic and caustic chemicals, respectively. After the pH has been adjusted, the water to be treated enters photoreactor 114 containing UV lamp 118, and the treated fluid exits photoreactor 114 through pipe 120. A similar variation on this concept can be applied to fluids that are to be treated using solar UV light as described above.

Figure 7:
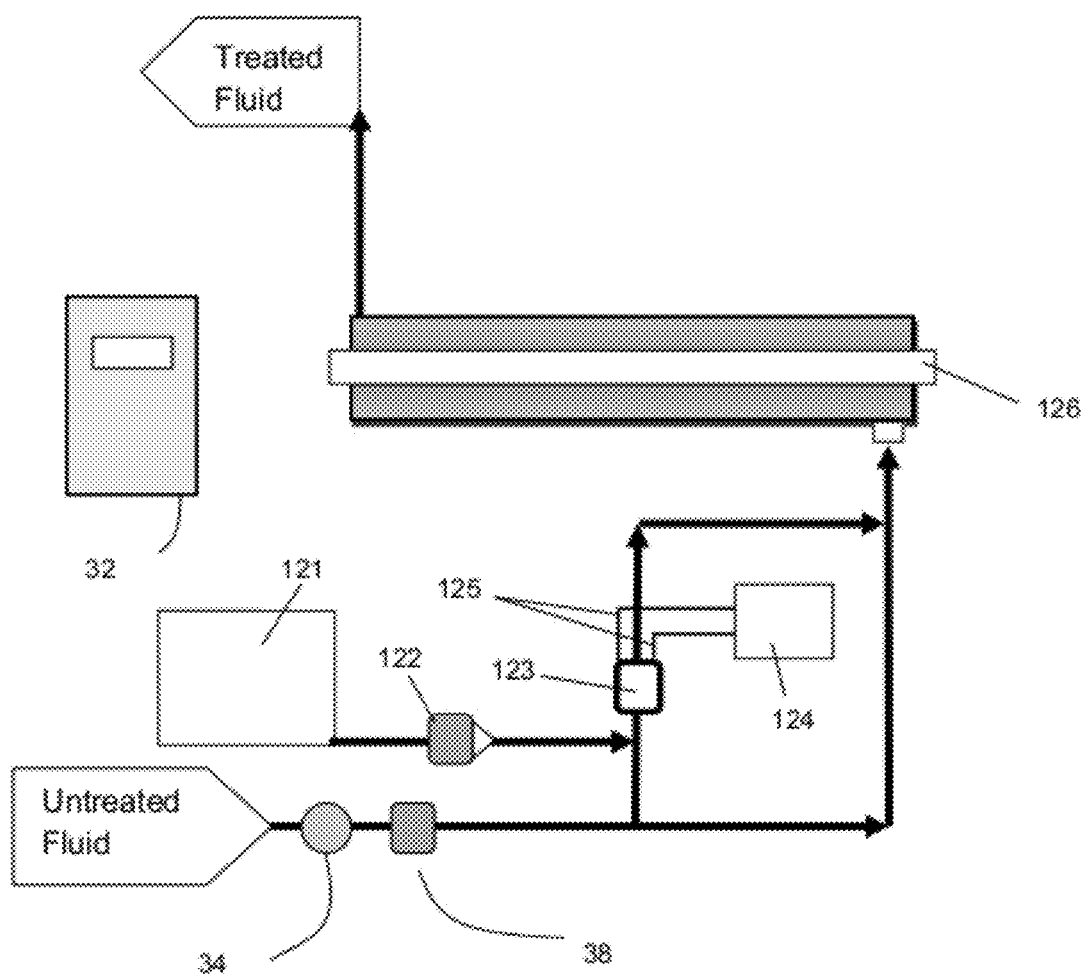
FIG. 7 is a schematic diagram showing an embodiment of the present invention which electrolyzes salt contained in the contaminated fluid.

Many contaminated waters requiring removal of complex organics and/or microorganisms are also fairly high in salt content, such as water produced in the oil and gas industry, for example frac water, and other industrial wastewater streams. In the embodiment shown in FIG. 7, in which some or all of the untreated fluid is passed through electrolytic cell 123, and the salts native to the contaminated water are used to create sodium hypochlorite and/or other oxidants. This can be a very cost effective means to create the initial oxidant for the AOP process. The potential supplied to the electrolytic cell 123 can be controlled via electrical contacts 125 from variable voltage and/or constant current DC power supply 124. Whenever electrolytic cell current begins to drop, the cell voltage can be increased, keeping electrolytic cell current constant, and thereby maintaining the oxidant concentration going into UV reactor 126 within desired limits. In the event that the dissolved salt content in the untreated fluid drops below a level required to create adequate concentrations of oxidants, as detected for example by monitoring increases in the electrolytic cell voltage required to maintain cell current, a variable speed brine pump 122 can be activated to supply salt from saturated brine source 121 to the untreated water for subsequent electrolysis in electrolytic cell 123.

EXAMPLES

Example 1

Initial case studies to evaluate destruction of organic materials in ground water contaminated with five contaminates including Tetrachloroethene (PCE) and Trichloroethene (TCE), and 1,1 DCE using MOS and UV compared to hydrogen peroxide and UV were performed. The PCE contaminant level was 39 µg/L, and the TCE contaminant level was 3 µg/L. Fifteen samples of contaminated ground water were treated with three different doses of mixed-oxidant solution at <2.0 mg/L and exposed to three different time durations of UV irradiation. The UV power density was equivalent to about 120 mW sec/cm$^3$ in clear water with minimal turbidity and a path length of less than 12 inches. The power density is total wattage from a lamp emitting ≥30% of the total wattage in the UV-C wavelength band with a peak emission of 254 nm.

The TCE, PCE and 1,1 DCE concentrations were reduced to <5 µg/L using a MOS UV combination. MOS injection alone 800 µg/L (as equivalent chlorine), without UV irradiation, reduced concentrations of Freon 113 and 1,1 DCE significantly, TCE slightly (−5%), and PCE not at all. MOS also had no effect on the concentrations of $CHCl_3$, $CCl_4$, and 1,2-DCA. UV irradiation alone, without MOS injection, reduced Freon 113, 1,1-DCE and PCE regularly to concentrations below MCLs, and TCE regularly to concentrations still well above the MCLs. UV irradiation alone had no effect on the concentrations of $CHCl_3$, $CCl_4$, and 1,2-DCA which are already at low concentrations as noted above. MOS injection had a dramatic effect on the effectiveness of UV irradiation at destroying 1,1-DCE, TCE, and PCE; generally less UV irradiation (fewer UV lamps) were required to achieve the same concentrations, and much lower concentrations were achieved after UV irradiation by all four lamps compared with the no-MOS control. The MOS/UV combination had minimal further effects on Freon 113 concentrations beyond that already affected by MOS alone or UV irradiation alone. The combination also had no effect on the concentrations of $CHCl_3$, $CCl_4$, and 1,2-DCA which are already at low concentrations.

Conclusions from these studies are that OSG MOS generated in a single solution offers several advantages over other groundwater remediation technologies that rely on single oxidant species. The presence of free radicals in solution or as precursors is necessary in order for UV irradiation to create or enhance hydroxyl radical formation. The mixed-oxidant solution appeared to contain both the free radical precursors as well as a chlorine component that facilitates organic contaminant destruction as well as disinfection in the treated water. Other advantages include:

TCE and PCE contaminant levels at 200 parts per billion (ppb) were reduced to below the Maximum Contaminant Level (MCL) of 5 ppb.

Material handling safety via use of an on-site oxidant generator that uses salt rather than chlorine compounds or other hazardous oxidants.

Low cost operation—less than 10 cents per 1000 gallons treated, and reasonable capital costs.

High performance mixed-oxidants that act synergistically to destroy organisms that are unaffected by chlorine alone, including *Cryptosporidium parvum* and *Giardia*.

Mixed-oxidants that also contain some level of chlorine that allows for conventional analysis of chlorine residual.

To further evaluate these studies, a more thorough comparative laboratory study was conducted and is detailed below.

Example 2

Comparative research using chlorine-based oxidants and two different UV wavelength ranges was conducted. The project succeeded in demonstrating that aqueous free available chlorine (FAC) derived from on-site generation of a Mixed Oxidant Solution (MOS) or a commercial bleach solution, combined with 254 nm or 365 nm high-energy ultraviolet (UV) light, was capable of producing an Advanced Oxidation Process (AOP) that removed or mineralized small organic molecules and had a measurable impact on the structure of natural organic matter (NOM). Photolysis studies on aqueous chlorine solutions demonstrated that both 254 nm (germicidal) or 365 nm (artificial solar) UV light could be used to decompose FAC and that, under 254 nm irradiation, FAC decomposition was pH-independent while pH played an important role for reactions illuminated with 365 nm light.

Several experiments demonstrated that chlorine based AOPs were able to effect chemical transformation of organics in water. Partial mineralization was observed for two NOM analog molecules, while other tests found that common contaminants, including tris-(2-chloroethyl)-phosphate (TCEP), were removed from solution. Reactions conducted with Colorado River Water (CRW) NOM indicated that NOM structure was changed as a result of this process, but precise structural changes could not be determined from the data obtained in these tests. Reactions designed to investigate the production of both organic and inorganic disinfection byproducts (DBPs) revealed that the levels of trihalomethanes and haloacetic acids formed from CRW during this process were lower than federal maximum contaminant levels (MCLs) and, in the case of trihalomethanes, production levels were equivalent to chlorination in the absence of UV irradiation. Doses of both chlorine and UV to achieve an equal impact on water quality may be lower than those for traditional AOPs. Thus, utilities currently using hydrogen peroxide/UV AOP could realize substantial cost and operational benefits by switching to a chlorine-based AOP. Moreover, in situations where a utility is looking to implement AOP for the oxidation of recalcitrant organic chemicals, the results indicate that superior removal may be achievable using chlorine as the chemical component of the AOP. The phases of the experiments were as follows:

Construction and Testing of a Bench Top Photoreactor: Versatile bench top quasi-collimated beam photoreactors with changeable configurations capable of delivering a variable UV dose using either 254 or 365 nm UV light were built. Tests on both UV intensities and chlorine degradation were conducted to determine the rough operating parameters for later reactions.

Photolysis of Aqueous Chlorine Solutions: Aqueous chlorine solutions with varying initial chlorine concentrations and pH values were photolyzed under a variety of illumination conditions, and the resulting changes in chlorine concentration and pH were tracked over time. These tests provided detailed information on how aqueous chlorine solutions behave during photolysis.

Removal of Small Organic Molecules: Experiments were conducted by spiking common water contaminates at low levels into aqueous chlorine solutions, followed by photolysis. These tests confirm that this process can chemically transform these common contaminants, effectively removing them from solution.

Mineralization of NOM Analog Molecules: Solutions containing NOM analog compounds were photolyzed in the presence of aqueous chlorine. Post-reaction decreases in Total Organic Carbon (TOC) levels indicated that partial mineralization of the organics occurred.

Impact of Chlorine Based AOPs on the Structure of CRW NOM: CRW, doped with aqueous chlorine, was photolyzed and the structural changes of the NOM tracked with a variety of analytical techniques. Results from these tests confirm that this process can impact the structure of NOM and may aid in carbon removal during conventional water treatment processes.

Production of DBPs during Chlorine Based AOPs: Tests on the levels of disinfection byproducts produced during aqueous chlorine based advanced oxidation were conducted to measure the potential impact of this process on water quality.

Economic Prospects of Chlorine Based AOPs.

These phases are described in more detail as follows.

Lab-Scale Photoreactor Design, Construction, and Testing

Figure 8A:
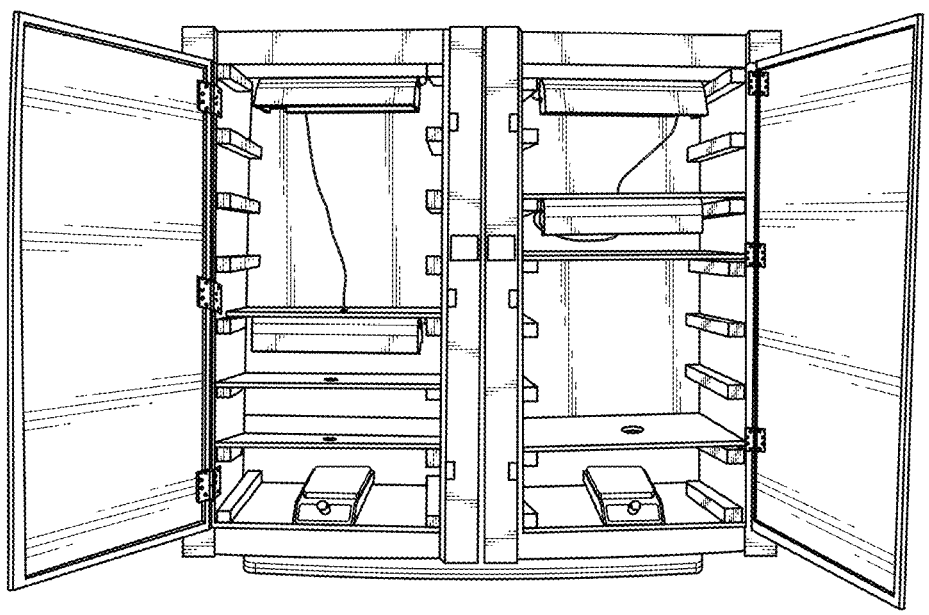
FIG. 8a is a photograph of the lab scale photoreactor as described in Example 2.
Figure 8B:
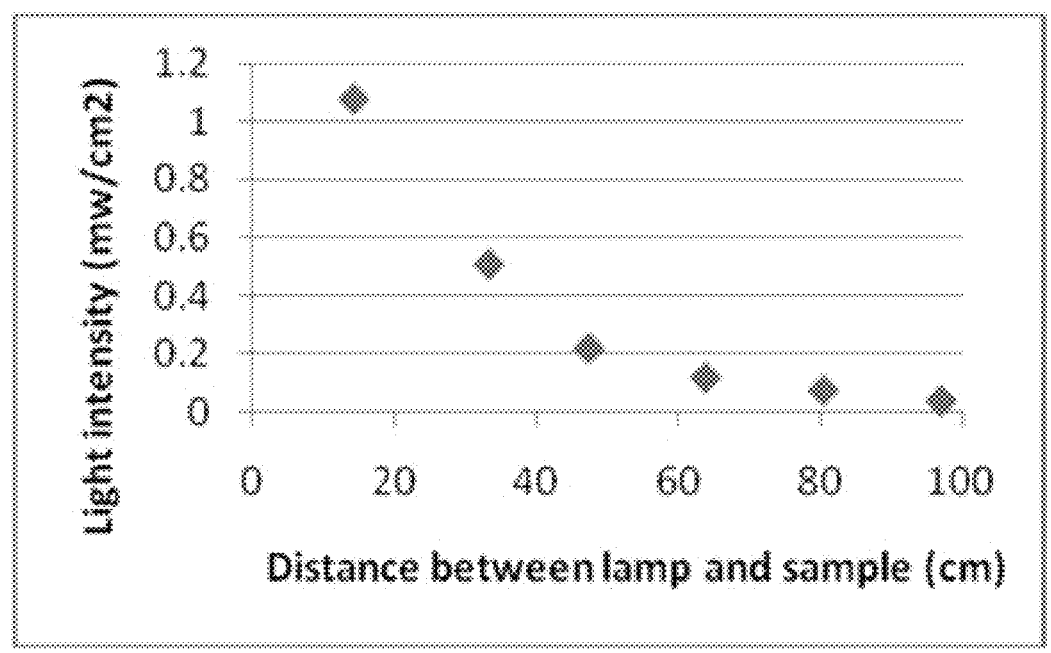
FIG. 8b is a graph showing the intensity of 254 nm UV light measured at the top of the stir plates with the lamp placed at different positions in the reactor.

Laboratory work on this project started with the design and construction of a dual, two-sided bench-top photoreactor used in all subsequent photolysis experiments (FIG. 8, left panel). The reactor has two identical sides each with dimensions of 24" wide, 48" high, and 18" deep. Several interior brackets were mounted on the sides for placing aperture plates used to collimate the light. One UV lamp housing was mounted on the top of the box (UVP XX-15 housings were used) and a second UV lamp housing was mounted on another shelf. A stir plate was placed at the bottom of each side of the box and a 50 mm high, 100 mm diameter crystallizing dish used through this study as reactor vessel. Shelves containing a 4.25" hole bored in the center were constructed to produce a quasi-collimation effect. Both lamp housings accommodated two UV tubes, and two reactors were built so simultaneous reactions using either 254 nm or 365 nm UV light could be conducted. Use of the 254 nm UV light was based on higher energy produced while 365 nm UV light was used to simulate solar light to determine if a solar UV driven AOP was possible. For all 254 nm irradiation reactions, UVP XX-15S tubes were used while for all 365 nm irradiation reactions, UVP XX-15L tubes were used. Here, the 254 nm UV tubes emitted light centered around 254 nm with small amounts of higher wavelength light while the 365 nm tubes emitted over a broad spectrum ranging from 310 to 410 nm, with a maximum peak intensity at 365 nm. By placing the lamp housing shelf and collimating shelves in different brackets, six set distances ranging from 14 to 97 cm could be obtained between the top of the reactor vessel and the UV bulbs. A UV radiometer was used to measure the intensity of 254 nm UV light for all six reactor configurations (FIG. 8, right panel), and the intensities ranged from 1.08 mW/cm2 with the lamp closest to the stir plate to 0.04 mW/cm2 for the lamps mounted at the top of the reactor. We were unable to measure the intensity of 365 nm UV light due to lack of a proper detector.

Figure 9:
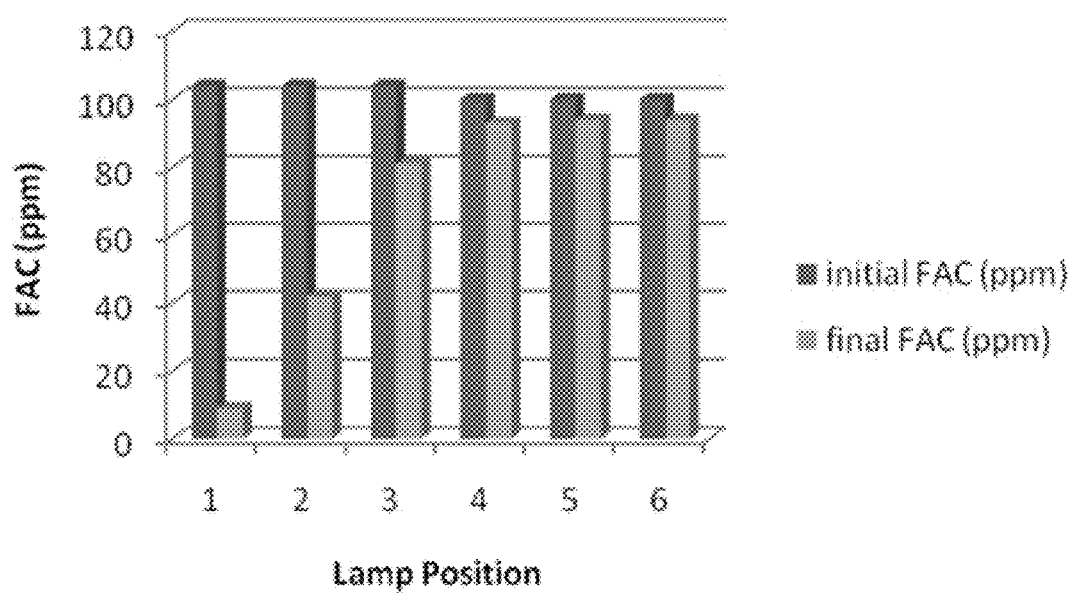
FIG. 9 shows the results of photolysis of 100 mg/L MOS with 254 nm UV light for two hours as described in Example 2. Lamp positions 1 to 6 correlate to UV doses of 7,776, 3672, 1584, 864, 457, and 288 mJ/cm$^2$ respectively for a two hour irradiation time.

Initial tests of the photoreactor examined the impact of lamp position on the photolysis of 100 mg/L FAC MOS solutions. Here, a solution of 100 mg/L MOS, pH adjusted to 7.5 with hydrochloric acid, was prepared and 275 mL of this solution poured into a glass crystallization dish. Lamps inside the photoreactors were adjusted to the desired lamp position, and the solution-filled dish placed on the stir plate. Stirring was set to 200 rpm, the reactor doors were closed, and the lamps turned on. After the sample was irradiated for two hours, it was removed from the reactor, and the final solution pH, FAC, and temperature were measured. For a two hour reaction time, the UV dose from the 254 nm lamps was calculated to be 7,776, 3672, 1584, 864, 457, and 288 mJ/cm2, for lamp positions 1 through 6, respectively. As expected, diminishment of FAC correlated strongly to UV dose. When solutions were irradiated with 254 nm UV light, 90% of the FAC was removed at lamp position 1 to around 6% removal at lamp positions 5 and 6 (FIG. 9). In lamp positions 1 and 2, the solution temperature was increased by approximately 3° C. during the course of the reaction. Substantial pH changes were also observed for some reactions. In lamp positions 1, 2, and 3, the pH dropped by about 4.3, 0.9, and 0.3 units, respectively. No pH changes were observed for reactions at lamp positions 4 through 6. Similar, but diminished, effects were seen in solutions irradiated with 365 nm UV light. Here, FAC was reduced by about 50% and 25% in lamp positions 1 and 2 with little or no reduction for the other positions. Similarly, the post-illumination pH values of reactions in positions 1 and 2 dropped by 1.3 and 0.2 pH units, respectively, and solution temperature increases were similar to samples illuminated with 254 nm UV light.

Photolysis of MOS and Bleach

Understanding how dilute solutions of aqueous chlorine, both MOS and bleach, behave under irradiation in this photoreactor was a prerequisite for designing the experimental conditions to evaluate AOP effect on various types of organic compounds. As such, a series of photolysis reactions where initial conditions were varied and monitored throughout a two hour exposure time were conducted. The goal of these reactions was to understand how solution pH and FAC concentration changed as a function of exposure time (and therefore UV dose) as well as determine the levels of oxyhalides (chlorate and perchlorate) produced during the reaction. Here, solutions containing 10, 100, or 1000 mg/L FAC as either MOS or bleach were prepared in deionized, un-buffered water. Initial solution pHs were set to 6, 7.5, or 9 by the addition of either hydrochloric acid or sodium hydroxide. These solutions were then placed in the photoreactors and irradiated with either 254 or 365 nm UV light for a total of two hours. To quantify what was occurring during photolysis, samples were removed after 5, 10, 15, 30, 60 and 120 minutes and the FAC levels and solution pH measured. After 120 minutes of exposure, samples were removed and quenched with malonic acid and later assayed for chlorate and perchlorate levels using Liquid Chromatography/Mass Spectroscopy.

Figure 12A:
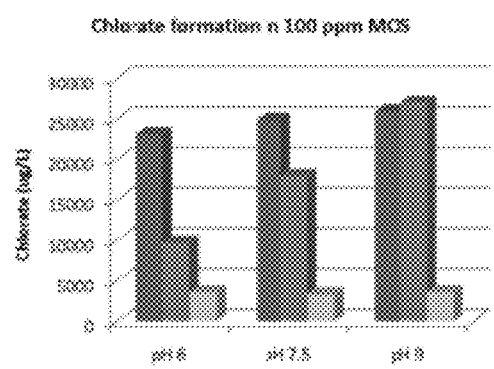
FIGS. 12a and 12b are graphs showing the formation of chlorate and perchlorate during the irradiation of 100 mg/L MOS or bleach at various pH values with either 254 or 365 nm UV light for Example 2.

Irradiation of 100 mg/L FAC MOS with 254 nm light (total UV dose of ~7700 mJ/cm2) produced a rapid decline in the FAC of the solution at all pH values, eventually consuming nearly all of the chlorine in the solution after a reaction time of 120 minutes (FIG. 10a). In contrast, chlorine removal was highly dependent on initial pH for reactions run with 365 nm UV light, where increased rate of FAC decomposition was observed in solutions at higher pH (FIG. 10b). Substantial changes in pH were seen in all reactions, with all reactions exhibiting a decrease in pH resulting from the expected production of hydrochloric acid, one of the main products resulting from the photolysis of aqueous chlorine (FIG. 11). Chlorate production was also found to be a function of both pH and irradiation wavelength (FIG. 12a). Here, initial 100 mg/L FAC MOS solutions contained about 3.5 mg/L chlorate (35 µg chlorate/mg FAC). Solutions irradiated with 254 nm UV light produced roughly the same amount of chlorate regardless of initial solution pH while solutions irradiated with 365 nm UV light produced an increasing amount of chlorate with increasing initial solution pH. While similar qualitative changes in chlorate production levels were seen in solutions with initial FAC levels of 10 and 1000 mg/L, the relative amounts of chlorate produced did change dramatically. With solutions initially containing 10 mg/L FAC, the maximum amount of chlorate formed was 0.95 mg/L for pH 9 solutions irradiated with 254 nm UV light while for the same reaction conditions using a solution with an initial FAC of 1000 mg/L produced a solution containing 170 mg/L chlorate.

Figure 12B:
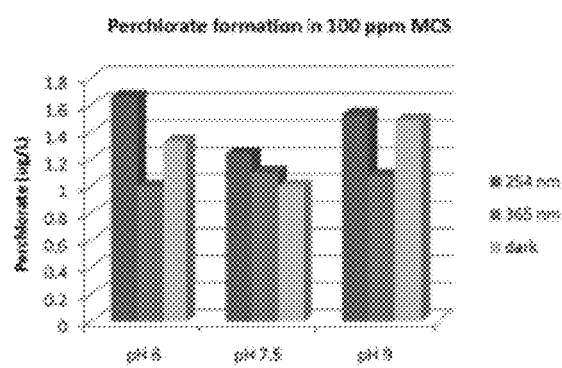

Perchlorate levels, which were initially at 1.5 µg/L perchlorate (0.015 µg perchlorate/mg FAC), were found to be essentially unchanged after photolysis at all reaction conditions with 100 mg/L solutions (FIG. 12b). Photolysis of 1000 mg/L chlorine solutions produced slight increases in perchlorate levels for reactions conducted with UV light. For example, 1000 mg/L MOS at pH 6 reacted with 254 nm UV light had an initial perchlorate level of 10.5 µg/L and a final concentration of 16.2 µg/L. Reactions carried out with bleach instead of MOS yielded qualitatively similar results in terms of both the trends in FAC removal and solution pH changes as a function of initial solution pH and irradiation wavelength. Oxyhalide levels in the bleach reactions, however, were different than those in the MOS reactions. For example, 100 mg/L FAC bleach reactions initially contained 18 mg/L chlorate (180 µg chlorate/mg FAC) and 4.5 µg/L perchlorate (0.045 µg perchlorate/mg FAC). After two hours of photolysis with 254 nm UV light and an initial solution pH of 9, chlorate was found to be 36 mg/L while perchlorate was measured to be 5.5 µg/L. Essentially, the same amounts of chlorate were produced, but the absolute levels were higher due to the higher initial concentrations. Again, these data are consistent with what is known about the photolysis mechanism of aqueous chlorine in that chloric acid (HClO3) is produced during photolysis. Perchlorate production in these reactions was extremely low and could only be observed in reactions starting with 1000 mg/L FAC, indicating the formation of perchlorate is only an extremely minor component of the chlorine photolysis process. Photoassisted breakpoint reactions, where ammonia was added to the reactions immediately prior to photolysis, were conducted to measure the impact of the combined action of chlorine and UV on ammonia removal. In all reactions performed, no discernable differences were observed between using aqueous chlorine alone or with UV irradiation.

Removal of Small Organic Molecules

Figure 13:
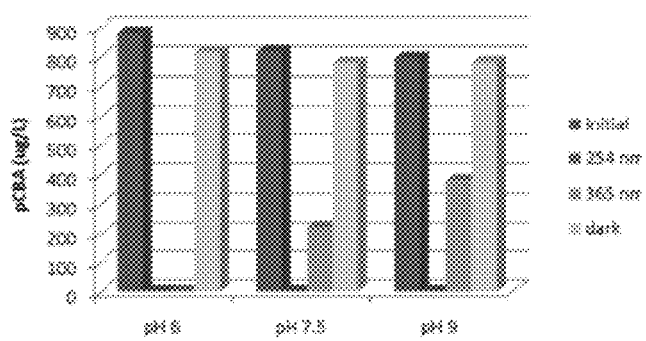
FIG. 13 is a graph showing the degradation of pCBA during reaction with MOS under irradiation with 254 nm and 365 nm UV light as well as no-illumination control reaction for Example 2.

Several tests were conducted to examine the ability of aqueous chlorine based AOPs to destroy small organic molecules. Initial studies were conducted using para-chlorobenzoic acid (pCBA), a common hydroxyl radical probe, in order to determine the relative OH radical exposure in each test condition. Deionized water solutions containing 1 mg/L pCBA were pH adjusted to 6, 7.5, or 9 and dosed with either MOS or bleach to 100 mg/L as FAC. These solutions were then placed in the photoreactor and irradiated with either 254 or 365 nm UV light for two hours (UV dose for 254 nm light was ~7700 mJ/cm2), followed by quenching with malonic acid and analysis of the residual pCBA content. Control reactions were also conducted where the pH-adjusted, chlorine-added solutions were stirred in the dark for two hours and then analyzed using the same methods. Additional control reactions used pH-adjusted pCBA solutions irradiated in the absence of added chlorine. Removal of pCBA was found to be a function of both initial solution pH as well as irradiation wavelength (FIG. 13). In the case of reactions conducted with 254 nm UV light, no detectable pCBA remained at the end of the reaction. However, since control reactions with no added chlorine and 254 nm UV irradiation resulted in ~80% removal of the pCBA, the impact of added chlorine was difficult to discern. In reactions performed with 365 nm UV light, we found increasing amounts of pCBA removal with decreasing initial solution pH. Control reactions using 365 nm UV irradiation with no added chlorine did not exhibit any pCBA removal, indicating removal under these conditions resulted entirely from an AOP. Similar results were observed for reactions performed with bleach in place of MOS (data not shown). Chlorate and perchlorate production levels in these solutions were measured to ascertain the impact of the presence of organics on the amounts produced. For most reactions, chlorate and perchlorate levels were similar to reactions conducted in the absence of pCBA, however, when initial solution pH was adjusted to 6, we observed a 17% and 10% reduction in the amount of chlorate for reactions irradiated with 254 nm and 365 nm UV light respectively (data not shown).

Figure 14:
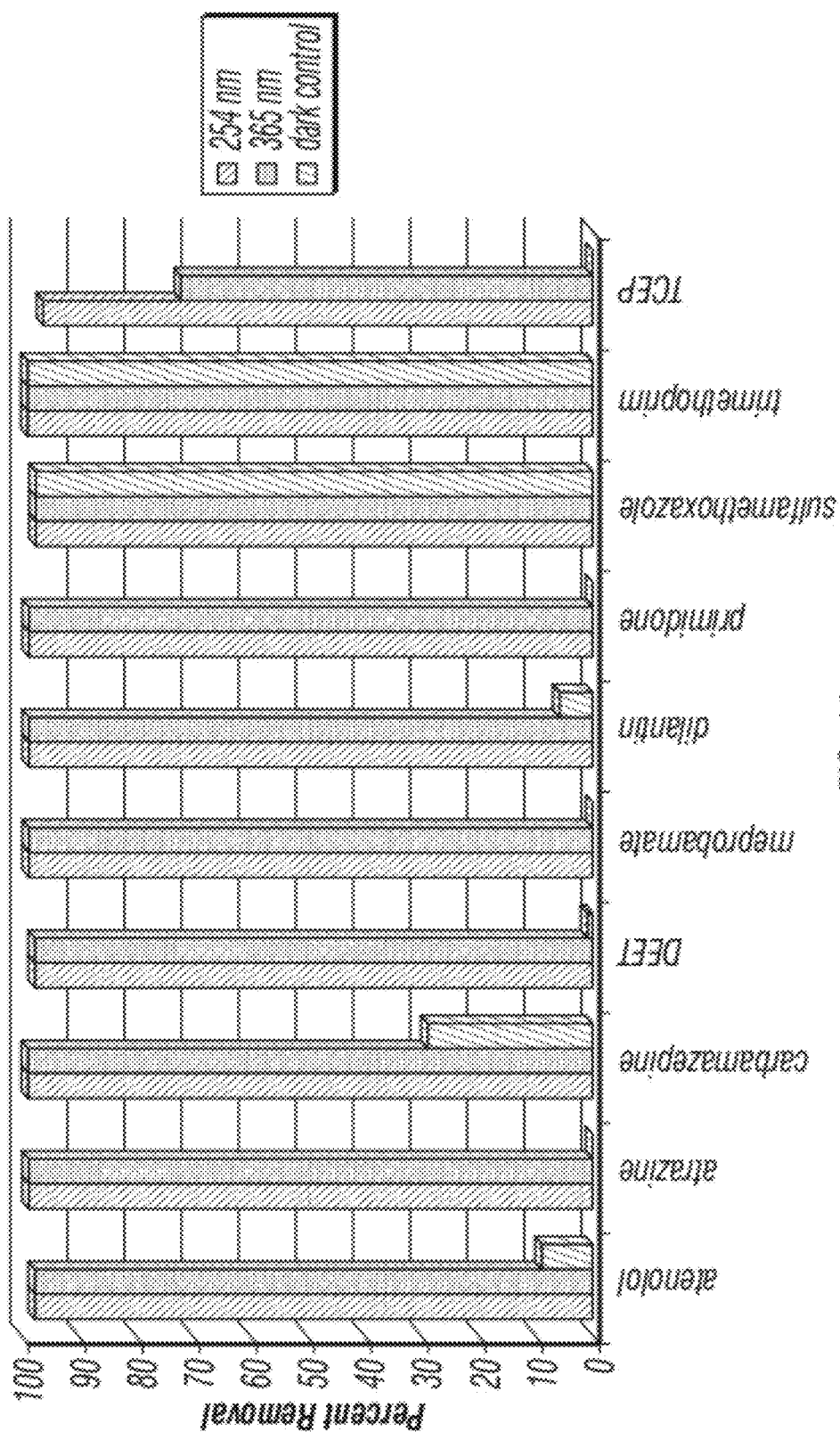
FIG. 14 shows removal of TOrCs during irradiation of spiked solutions of 10 ppm pH 6 MOS for two hours for Example 2.

Further investigations on the removal of small organics was accomplished using a set of organic chemicals that are representative of common trace organic contaminants (TOrCs) used in previous studies to explore the differences between various traditional AOP methods. Components of the TOrC set used in this study were atenolol, atrazine, carbamazepine, N,N-Diethyl-meta-toluamide (DEET), meprobamate, dilantin, primidone, sulfamethoxazole, tris- (2-chloroethyl)-phosphate (TCEP), and trimethoprim. These compounds were selected to include a variety of TOrCs that range in their resistance to chlorination, UV photolysis, and advanced oxidation processes (e.g., sulfamethoxazole is easily photolyzed; trimethoprim is easily oxidized by chlorine; atenolol is easily oxidized by ozone, but not chlorine; meprobamate is only oxidized by AOPs; TCEP is highly resistant to AOPs and other chemical removal processes). Here, deionized water was pH adjusted to 6, 7.5, and 9 and then dosed to 10 mg/L FAC with either MOS or bleach. The TOrCs were then added so that the initial concentrations ranged between 1000 and 5000 ng/L. Solutions were then irradiated (UV dose for 254 nm light was ~7700 mJ/cm$^2$) and residual TOrCs concentrations were determined. Reactions run with MOS demonstrated the effective total removal of all compounds using 254 nm UV light with an initial solution pH of 6 while only a small amount of TCEP remained behind in reactions photolyzed with 365 nm UV light (FIG. 14).

At higher solution pH values, no effective changes were observed for reactions conducted under 254 nm UV light except the case of TCEP in reactions run at a pH of 9, where approximately 20% removal of TCEP occurred. Higher pH reactions photolyzed with 365 nm light were still able to remove most of the TOrCs present in the initial solution, but more than 10% of the initial levels of atrazine, DEET, meprobamate, dilantin, primidone, and TCEP remained at the end of the reaction. Reactions performed in the absence of any added chlorine resulted in the total removal of atrazine, dilantin, and sulfamethoxazole with 254 nm UV light alone. Thus any potential benefits of added chlorine could not be evaluated on the removal of these compounds in the present study. In contrast, 365 nm UV light did not remove any of the compounds tested, indicating that all observed removal was due to an AOP. As with the pCBA tests, little difference was observed between reactions conducted with bleach compared to MOS. However, the observed removal of TCEP under 254 nm UV light and 10 mg/L FAC is highly significant: No oxidative drinking water treatment process has been able to demonstrate removal of TCEP at energy levels similar to those used in this study. Thus, the combined UV/MOS process has the potential to offer significant improvements over existing technologies.

Mineralization of Natural Organic Matter Analog Molecules

To further evaluate the benefits of chlorine based AOP on NOM mineralization, two NOM analog molecules, ortho-methoxybenzoic acid (oMBA) and 4,6-dioxoheptanoic acid (46 dha) were utilized. Each of these compounds is structurally similar to chemical subunits of NOM, providing a model to evaluate changes associated with AOP. In these tests, 1000 mg/L FAC MOS or bleach solutions in deionized water were pH adjusted to 6, 7.5, or 9. These solutions were then dosed with either oMBA or 46 dha to achieve an initial TOC level of 10 mg/L, followed by either photolysis with 254 or 365 nm UV light (UV dose for 254 nm light was ~7700 mJ/cm$^2$) or stirring in the dark for two hours. After the reactions were complete, the solutions were quenched with sodium thiosulfate and the final TOC levels of the solutions measured. Control reactions were irradiated with either 254 or 365 nm UV light in the absence of added chlorine and analyzed using the same procedure. The data indicate that oMBA was mineralized most efficiently at pH 6 for both 254 and 365 nm UV light (FIG. 15a), with removal of 49% achieved. Mineralization of 46 dha was more strongly correlated to pH (higher removal with lower pH, FIG. 15b). No mineralization of oMBA or 46 dha was observed for reactions without the addition of chlorine, and reactions where bleach was used in place of MOS yielded similar levels of mineralization compared to the MOS reactions (data not shown). Even partial mineralization under certain conditions demonstrates that chlorine based AOP is very aggressive and potentially can be very effective for contaminant destruction.

Figure 16A:
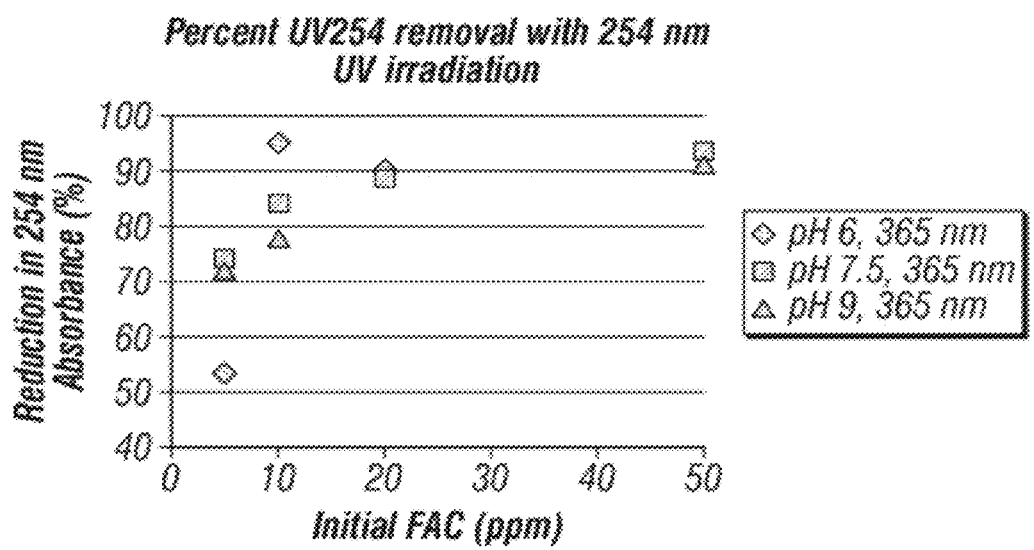
FIGS. 16a and 16b are graphs showing the reduction in $UV_{254}$ absorbance resulting from the photolysis of MOS dosed CRW solutions for Example 2.
Figure 16B:
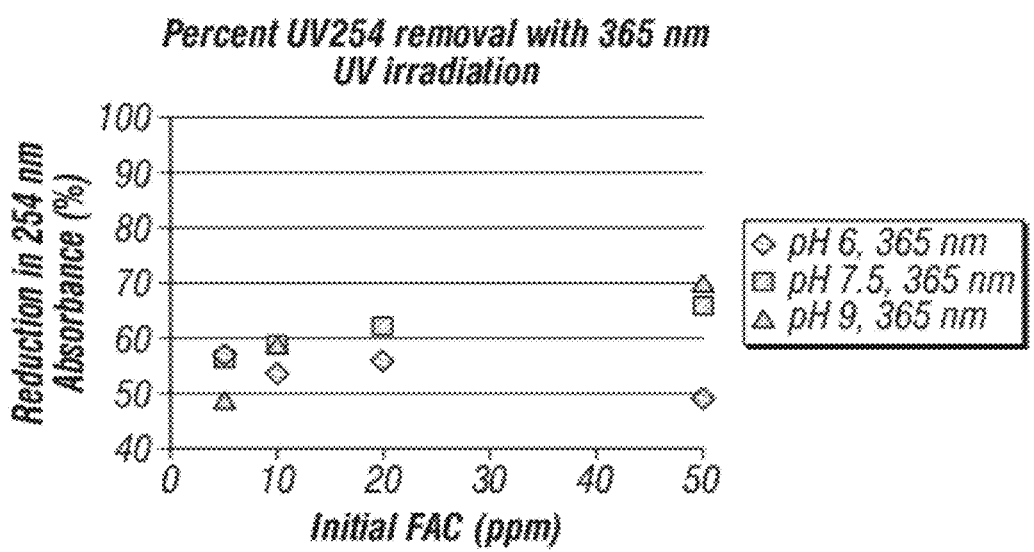

Impact of Chlorine Based Advanced Oxidation Processes on the Structure of Natural Organic Matter from the Colorado River Initial experiments observing the impact of aqueous chlorine AOPs on NOM structure were conducted by monitoring the changes in the UV254 absorbance (UVA) of the NOM. In these tests, samples of raw CRW were adjusted to have a pH of 7.5 and then dosed with bleach or MOS to between 5 and 50 ppm FAC. Reactions were then exposed to 254 or 365 nm light for two hours (UV dose for 254 nm light was ~7700 mJ/cm$^2$), and the final UVA measured. The data indicate that UVA was more effectively reduced in reactions using 254 nm UV (FIG. 16a) light as compared to 365 nm UV light (FIG. 16b). Irradiation of CRW without added chlorine produced a 30% reduction of UVA with 254 nm UV light and no measurable difference with 365 nm UV light. Before and after TOC measurements were made on reactions conducted with 2 or 10 ppm doses of MOS and bleach with starting pHs of 6, 7.5, and 9. In all reactions, as well as in controls with no added chlorine, very little differences between initial and final solution TOCs were observed. In all cases, similar results were seen for reactions dosed with either MOS or bleach (data not shown).

Structural changes in NOM were next examined using three dimensional fluorescence (3D-Fluoresence), Size Exclusion Chromatography-Fluorescence (SEC-Fluorescence), and Polarity Rapid Assessment Method (PRAM) analysis. In all cases, solutions of CRW were dosed to 10 ppm FAC as MOS or bleach and pH adjusted to 7.5, followed with photolysis with either 254 or 365 nm UV light for two hours (UV dose for 254 nm light was ~7700 mJ/cm$^2$). Samples were then quenched with sodium thiosulfate and examined. 3D-Fluoresence spectra (FIG. 17), along with regional integration analysis, showed that the largest fluorescence component of CRW is due to humic-like structures. In the 3D-Fluoresence spectrum of CRW NOM that had been dosed with MOS but not exposed to UV irradiation (FIG. 17a), this can be seen as the light blue region in the data. When these samples were exposed to either 254 (FIG. 17b) or 365 (FIG. 17c) nm UV light for two hours, this region of the spectrum was less intense, indicating transformation of the fluorescent humic acid-like components of the NOM or a loss in overall NOM aromaticity. Approximately 80% reduction in the total fluorescence of the raw CRW NOM was observed after photolysis. Results from both SEC-Fluorescence (FIG. 18a) and PRAM (FIG. 18b) also allude to NOM structural changes, however, no reliable conclusions about the precise nature of changes in NOM structure can be made from the current data set due to the type of detection used (UV absorbance). In all tests, similar results were obtained from samples dosed with bleach as compared to those using MOS (data not shown).

Production of Disinfection Byproducts During Chlorine Based Advanced Oxidation Reactions One of the largest concerns of using aqueous chlorine based AOPs is the potential for the formation of inorganic and organic DBPs. Bromate ($BrO_3^-$) is the primary regulated inorganic DBP of concern since solutions containing bromide can form bromate under strong oxidizing conditions. Bromate formation was tested by preparing solutions in deionized water that contained 10 mg/L MOS or bleach spiked with 0.5 mg/L bromide (as sodium bromide, exact bromide levels were not measured). Solution pH was adjusted to 6, 7.5, or 9 and the solutions were then irradiated with either 254 or 365 nm light for two hours (UV dose for 254 nm light was ~7700 mJ/cm$^2$). Solutions were then quenched with malonic acid and the levels of bromate determined. Dark control reactions were also analyzed using the same procedure. Starting levels of bromate were determined by quenching a portion of the initial solutions immediately after preparation. Results indicate that bromate production with MOS was a function of both initial solution pH as well as irradiation light wavelength (FIG. 19). Bromate production with 254 nm UV light was highest at pH 6 and dramatically lowered at pH 7.5 and 9. Solutions irradiated with 365 nm light produced much less bromate, with little variability as a function of initial pH. Results from bleach reactions were qualitatively similar, with about half as much bromate formed with 254 nm UV light at pH 6 and slightly less at pH 7.5 and 9. Bleach samples irradiated with 365 nm light produced similar amounts of bromate, with the exception of solutions with an initial pH of 9, where more bromate was produced as compared to the MOS reaction.

As a comparison, non irradiated MOS samples contained around 0.7 µg/L bromate, bleach solutions had bromate levels of around 5.5 µg/L (both MOS and bleach solutions were 10 mg/L FAC), and bromate was undetectable in sodium bromide solutions irradiated with UV light in the absence of bleach or MOS (data not shown). While in all cases the levels of bromate formed in these reactions is higher than the MCL of 10 µg/L, it is likely that bromate production will be mitigated by the presence of organics as was observed for chlorate production in the presence of pCBA, and thus will not cause an implementation issue. Additionally, these results are taken from a worst-case scenario for drinking water. Actual conditions will likely use less chlorine and actual waters will probably have lower bromide levels.

Figure 20:
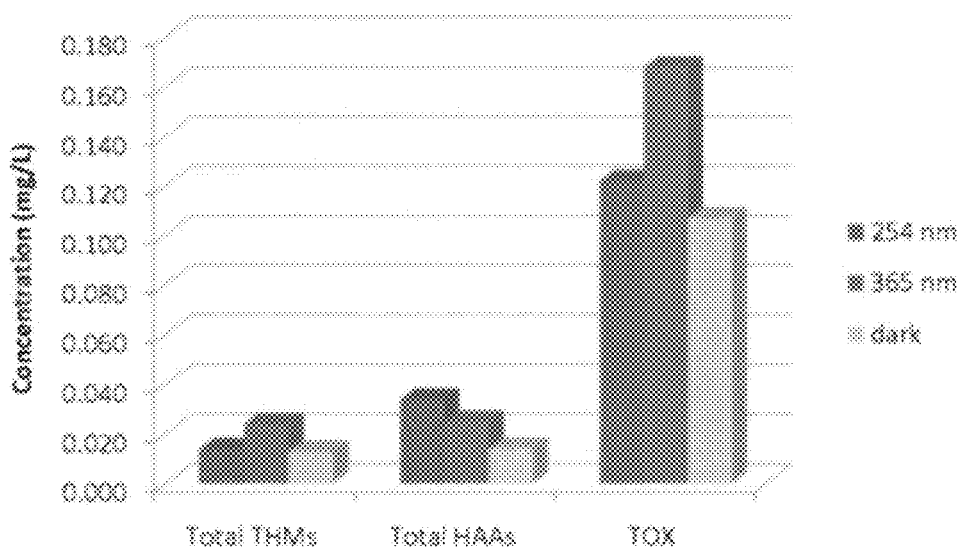
FIG. 20 shows graphs of organic DBPs formed as a result of reaction of CRW with MOS under various irradiation conditions for Example 2.

Organic DPB production, including trihalomethanes (THMs), haloacetic acids (HAAs) and total halogenated organics (TOX), was studied for reactions that used both NOM analog molecules and CRW NOM as the source for organic material (FIG. 20). In the case of NOM analog molecules, 1000 mg/L solutions of MOS or bleach oMBA or 46 dha were spiked at 10 mg/L as TOC and the pH adjusted to 7.5. These conditions were selected to mimic the mineralization reactions conducted previously. Solutions were irradiated for two hours with either 254 or 365 nm UV light (UV dose for 254 nm light was ~7700 mJ/cm2), then quenched and analyzed for the presence of THMs, HAAs, or TOX. Similarly, CRW was dosed to 10 mg/L with either bleach of MOS and the pH adjusted to 7.5. After two hours of irradiation with either 254 or 365 nm light (UV dose for 254 nm light was ~7700 mJ/cm2), the samples were quenched with sodium thiosulfate and THM, HAA, and TOX levels measured. In all cases, dark control samples were analyzed following the same procedure. Total THM (TTHM) production in reactions conducted with NOM analog molecules provided interesting differences in TTHM levels as a function of molecule and reaction condition. For oMBA, an equal amount to TTHMs were produced under 254 nm illumination or the dark control reactions while about five times as much were produced for the reaction using 365 nm UV light. TTHMs were produced at the highest level when 46 dha was reacted in the dark, with less production for the 365 nm UV irradiation reaction and the least formed in the 254 nm reaction. For CRW, the highest TTHM levels were produced from the 365 nm reaction while much lower levels were found for both the 254 nm and dark reactions. It is important to note, however, that even in the worst-case reaction conditions, the TTHM levels of CRW are well below the federal maximum contaminant level (MCL) of 80 µg/L. For HAA formation in CRW, the highest level of HAAs was observed for reactions irradiated with 245 nm UV light, followed by decreasing levels for the 365 nm UV and then dark control reactions, respectively. Like the observed TTHM levels in CRW reactions, even the worst-case result is still well below the MCL for HAAs of 60 µg/L. The highest TOX levels in CRW were seen for reactions irradiated with 365 nm UV light, with only slightly higher amounts produced from the reaction conducted under 254 nm UV light as compared to the dark control reaction. Formation of both THMs and HAAs was similar in terms of the total levels formed and impact of reaction conditions for tests conducted with either MOS or bleach. However, TOX levels, while qualitatively similar, were slightly higher for MOS reactions as compared to bleach reactions.

The experimental results show that 254 nm UV light was clearly more effective at both consuming chlorine as well as transforming or mineralizing small organic molecules as compared to 365 nm UV light, indicating that this process would be best suited for waters where control over pH would be difficult or expensive. While significant levels of chlorate and perchlorate were formed during photolysis, under some conditions and the presence of organics, chlorate productions were limited, indicating that proper selection of reaction conditions will minimize potential issues associated with the production of oxychlorides. Conversely, both chlorine photolysis and organic removal were strongly pH-dependent when using 365 nm light. Here, chlorine photolysis increased with increasing pH while organic removal increased with decreasing pH. While this presents a potential difficulty in terms of the need to provide a higher level of control over pH during the reactions, it also indicates the possibility that properly concentrated solar light may be feasible as the illumination source in these reactions.

In terms of organic contaminant removal, it was shown that aqueous chlorine AOPs can remove TCEP, a highly recalcitrant compound. AOP reactions with NOM confirmed that the UV-chlorine process can impact the overall NOM structure. Results from both the reduction of UV254 absorbance and 3-D Fluorescence indicate that the humic acid-like component of the NOM is destroyed in great extend by this reaction. Results from both SEC-Fluorescence and PRAM analysis of CRW NOM reacted under these conditions confirmed that the AOP was causing a change in the structure, but a detailed and specific understanding of the nature of those structural changes cannot be provided with the data generated at this time. In no case where chlorinated CRW solutions were photolyzed was the production of regulated organic DBPs higher than MCLs. While there was some variance in the production of THMs and HAAs in regards to photolysis conditions, it is likely that production of organic DBPs will not be a barrier to implementation of this technology. Moreover, DBP tests conducted represented worst-case scenarios with high UV and chlorine doses. Therefore, risk mitigation will likely be achieved by optimizing the doses to obtain the desired removal levels.

Economic Prospects of Chlorine Based Advanced Oxidation Processes

In the municipal drinking water industry, there are three main applications for traditional AOPs: water reuse through the removal of TOrCs from water, taste and odor mitigation, and volatile organic compounds (VOC) removal at ground water well sites. The most commonly used AOP for these applications is the traditional combination of high energy 254 nm UV light with $H_2O_2$. To achieve VOC removal now, $H_2O_2$ dose ranges are typically 10-1000 ppm due to the high background oxidant demand. Demand from ammonia, dissolved sulfur, total organic carbon and other sources must be satisfied before hydroxyl radicals can be made and sustained long enough to oxidize the VOCs. In contrast, due to the powerful oxidizing capabilities of chlorine, typically 2-100 ppm is required to satisfy oxidant demand possibly allowing for much less chlorine use, resulting in decreased operational costs from chemical consumption. This, coupled with the more efficient quantum yields of hydroxyl radicals from chlorine compared to $H_2O_2$ reported in the scientific literature, indicates that operating costs may be lowered even further through the reduction in the use of energy. Similar effects would be expected when using aqueous chlorine in AOPs aimed at the removal of taste and odor compounds.

Water reuse is a major municipal market driver as water scarcity and water stress increases worldwide. Several nations are actively pursuing reuse projects for drinking, industrial, and agricultural water. Another attractive water reuse application is using treated wastewater for recharging aquifers, which can serve to form a barrier against seawater intrusion or prevent land subsidence due to ground-water or gas/oil removal. The key advantage with the chlorine-based AOP is that $H_2O_2$ will never need to be introduced into the treatment train, and subsequently additional chlorine will not be required to quench the $H_2O_2$. Moreover, MOS can be used as both the chemical component of the AOP as well as a powerful disinfectant, accomplishing two jobs with one on-site generated chemical. An additional benefit MOS AOP can preset over traditional AOP is reduced maintenance associated with traditional UV systems. Historically, quartz sleeves in UV reactors become biofouled, resulting in downtime and maintenance costs. MOS has been shown to be much more effective than chlorine in removing biofilms and thus would likely help to ease operations by enhancing cleaning, decreasing maintenance time, and providing a single chemical source for all reactor operations.

Other advantages of embodiments of the present invention include:

- A less expensive chemical can be used compared to traditional oxidants used in AOPs: MOS produced from salt using an on-site generator (OSG) is less expensive per pound of produced chemical than ozone or $H_2O_2$, the chemicals used in traditional AOPs. For example, the chemical cost of $H_2O_2$ is estimated to be 10 times more expensive for the same efficiency with MOS. Thus, lifecycle costs for the MOS AOP could be very attractive in comparison to other AOPs.
- Fresher chemical: stored chemicals eventually degrade, but on-site generated chemicals will always be produced on demand.
- More efficient photolysis: If literature data indicating that hydroxyl radical quantum yields resulting from chlorine photolysis are higher compared to $H_2O_2$ are verified in further testing, the overall process will be much less expensive through a reduction in the amount of energy consumed to achieve the same level of hydroxyl radical production. Alternatively, customers could use smaller UV reactors with fewer bulbs, minimizing maintenance costs.
- Greener process: By utilizing solar UV (in appropriate situations) as opposed to traditional low pressure or medium pressure UV lamps, MOS-based AOPs present a greener application through the use of renewable energy sources.
- Multiple uses for chlorine: Besides a chemical source for AOP, MOS can also be used as a disinfectant, allowing the customer to benefit from increased MOS production efficiencies associated with larger OSGs.
- More effective at organic removal: MOS based AOP can more effectively remove a wider range of small organic molecules and persistent organic molecules (e.g., TCEP) as compared to traditional AOPs.

In addition, pharmaceutical formulation facilities are a significant source of opioids and other pharmaceuticals in wastewater effluents. Outflow from two wastewater treatment plants receiving more than 20 percent of their wastewater from pharmaceutical facilities had 10 to 1000 times higher pharmaceutical concentrations than wastewater plants that do not receive wastewater from pharmaceutical manufacturers. All of these factors indicate that treatment of industrial wastewater from pharmaceutical manufacturing operations represents a large market opportunity for this technology.

Aqueous chlorine has been shown to be a successful chemical component of an AOP. The success of this approach was demonstrated through experiments showing that aqueous chlorine AOPs can remove small organic molecules from solution, probably through transformative chemical reactions resulting from oxidation by hydroxyl or other radicals. While complete mineralization of small organics was not shown here, partial TOC removal was observed and it is likely that total removal can be achieved with adequate adjustments of chlorine and UV doses. Moreover, we also verified that aqueous chlorine based AOPs can have an impact on the structure of NOM, an effect which can be utilized to enhance NOM removal through conventional water treatment processes. Moreover, tests conducted using 365 nm UV light indicate that it may be possible to harness solar light to serve as the UV component of this process. While w the UV dose levels used in these experiments are above what is typically employed for traditional AOPs, the proof-of-concept data obtained through our studies show great promise for the further development of aqueous chlorine based AOP technology.

Example 3

Figure 21A:
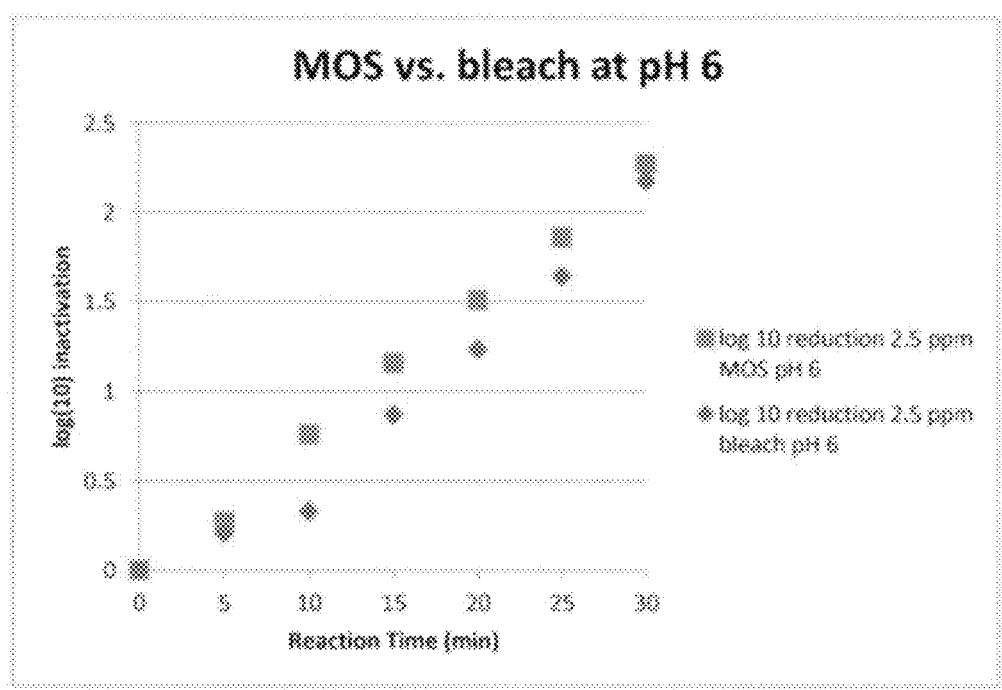
FIGS. 21a-21c show graphs comparing inactivation of *Bacillus globigii* spores using various combinations of aqueous chlorine and UV in accordance with Example 3.
Figure 21B:
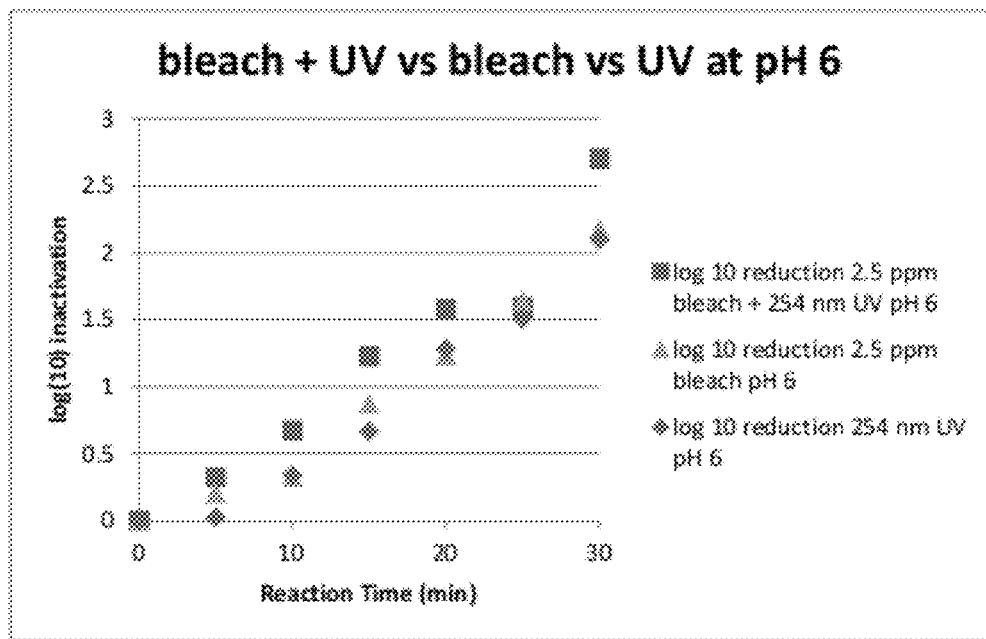
Figure 21C:
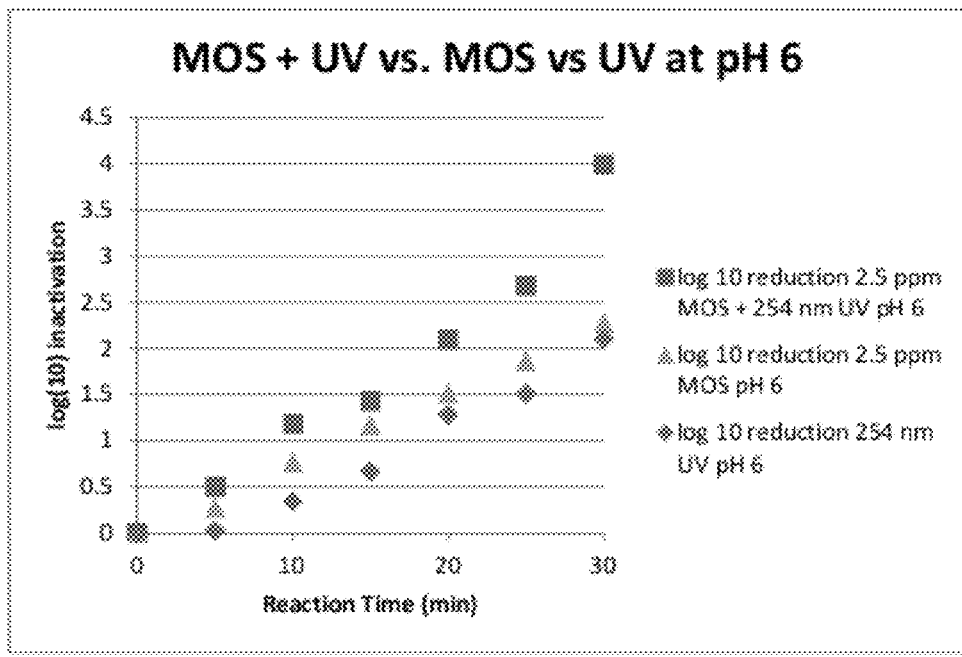

Inactivation of *Bacillus globigii* spores using a combination of aqueous chlorine and UV was examined. Here, spores were added to deionized laboratory water, which was then dosed with MOS or bleach with a FAC concentration of 2.5 mg/L. These solutions were then placed into a collimated beam photoreactor and irradiated with 254 nm UV light to deliver a UV dose of up to 46 mJ/cm2. During this time, samples were periodically removed, diluted if necessary using common dilution techniques, and spread onto agar coated Petri dishes. These dishes were then incubated and the number of surviving spores counted. These data were used to calculate the log inactivation as a function of applied UV dose, and these results are summarized in the graphs shown in FIG. 21.

Examination of the inactivation data for MOS and bleach alone produced the expected result that MOS was more effective at inactivating *B. globigii* spores as compared to bleach alone. When MOS was combined with 254 nm UV light, a clear enhancement of either MOS or 254 nm UV alone was observed. Here, both MOS and 254 nm UV achieved an log inactivation of just over 2. When MOS and 254 nm UV were combined, a log inactivation of 4±0.4 was achieved, demonstrating a dramatic increase in the number of spores inactivated due to this treatment. Similar effects were seen in solutions with pH values different than 6 as well as in solutions where bleach was used in place of MOS. However, the enhanced inactivation seen with bleach solutions was often less than that observed when MOS was used as the chemical component of this process. Overall, these results demonstrate that combining 254 nm UV light with aqueous chlorine, and especially when MOS is used as the aqueous chlorine source, significant enhancement of microbial inactivation can be achieved.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for destroying organic contaminants, the method comprising:
   adding at least one oxidant to a contaminated fluid, thereby forming a mixture, wherein the at least one oxidant comprises a chlorine-based oxidant;
   irradiating the mixture with ultraviolet radiation;
   photolyzing the at least one oxidant;
   measuring an amount of quality indicator remaining in the fluid; and
   adjusting the pH of the mixture prior to the irradiating step, thereby adjusting the ultraviolet absorption profile of the mixture, to subsequently reduce the amount of organic contaminant remaining in the fluid to at or below a desired level.

2. The method of claim 1 wherein the chlorine-based oxidant comprises hypochlorite, sodium hypochlorite, mixed oxidants, hypochlorous acid, or combinations thereof.

3. The method of claim 1 wherein the intensity of the ultraviolet radiation is greater than approximately 60 $mJ/cm^2$.

4. The method of claim 3 wherein the intensity of the ultraviolet radiation is greater than approximately 100 $mJ/cm^2$.

5. The method of claim 4 wherein the intensity of the ultraviolet radiation is greater than approximately 1000 $mJ/cm^2$.

6. The method of claim 1 wherein the ultraviolet radiation comprises a plurality of wavelengths.

7. The method of claim 6 wherein the adjusting step comprises adjusting the relative intensities of the different wavelengths.

8. The method of claim 7 wherein the relative intensities are adjusted depending on the pH of the mixture prior to the irradiation step.

9. The method of claim 6 wherein the ultraviolet radiation comprises concentrated solar radiation.

10. The method of claim 1 wherein the adjusting step comprises adjusting the concentration of the at least one oxidant in the mixture, a flow rate of oxidant into the contaminated fluid, a flow rate of the contaminated fluid, and combinations thereof.

11. The method of claim 1 further comprising generating the at least one oxidant using an on-site generator located near a source of the contaminated fluid.

12. The method of claim 11 wherein the generating step comprises using salt in the contaminated fluid to generate the at least one oxidant.

* * * * *